(12) United States Patent
Zhou

(10) Patent No.: US 6,898,316 B2
(45) Date of Patent: May 24, 2005

US006898316B2

(54) MULTIPLE IMAGE AREA DETECTION IN A DIGITAL IMAGE

(75) Inventor: Lingxiang Zhou, Fremont, CA (US)

(73) Assignee: ArcSoft, Inc., Fremont, CA (US)

( * ) Notice: Subject to any disclaimer, the term of this patent is extended or adjusted under 35 U.S.C. 154(b) by 621 days.

(21) Appl. No.: 10/010,053

(22) Filed: Nov. 9, 2001

(65) Prior Publication Data

US 2003/0095709 A1 May 22, 2003

(51) Int. Cl.$^7$ .............................. G06K 9/46; G06K 9/66
(52) U.S. Cl. ..................... 382/190; 358/450; 358/452; 358/453; 358/464; 358/521; 358/538; 358/540; 382/175; 382/225; 382/266; 382/282; 382/284; 715/513; 715/517
(58) Field of Search ................................. 382/173, 175, 382/199, 202, 203, 225, 266, 274, 282, 283, 284, 305, 154; 715/513, 517; 358/1.15, 2.1, 448, 450, 452, 453, 464, 474, 518, 523, 529, 538, 540

(56) References Cited

U.S. PATENT DOCUMENTS

| | | | | |
|---|---|---|---|---|
| 6,230,174 B1 | * | 5/2001 | Berger et al. | 715/513 |
| 6,636,648 B2 | * | 10/2003 | Loui et al. | 382/284 |
| 6,693,731 B1 | * | 2/2004 | Ohnuma et al. | 358/529 |
| 6,704,456 B1 | * | 3/2004 | Venable | 382/266 |
| 6,731,800 B1 | * | 5/2004 | Barthel et al. | 382/176 |
| 6,738,154 B1 | * | 5/2004 | Venable | 358/1.15 |
| 6,757,081 B1 | * | 6/2004 | Fan et al. | 358/474 |
| 6,757,444 B2 | * | 6/2004 | Matsugu et al. | 382/283 |
| 6,766,055 B2 | * | 7/2004 | Matsugu et al. | 382/173 |
| 6,771,818 B1 | * | 8/2004 | Krumm et al. | 382/225 |

OTHER PUBLICATIONS

"Depth First Search," http://www.nist.gov/dads/HTML/depthfirst.html, print date Nov. 2, 2001, 1 pg.

"ICS 161: Design and Analysis of Algorithms Lecture notes for Feb. 15, 1996", http://www.1.ics.uci.edu/~eppstein/161/960215.html, Last update May 2, 2000, print date Nov. 2, 2001, 5 pgs.

"Numerical Recipes in C: The Art of Scientific Computing," Cambridge University Press, Chapter 15.2, pp. 661–666, Fitting Data to a Straight Line.

Astra 6400 Scanner from UMAX Technologies, Inc., Features and Benefits, http://www.umax.com/consumer/features.cfm?model=Astra+6400, print date Oct. 19, 2001.

\* cited by examiner

*Primary Examiner*—Bhavesh M. Mehta
*Assistant Examiner*—Gregory Desire
(74) *Attorney, Agent, or Firm*—Patent Law Group LLP

(57) ABSTRACT

A method for detecting an image area in a digital image includes identifying in the digital image a first image region indicative of a background area and a second image region indicative of the image area, computing gradient values using the pixel values of the digital image, defining a list of strokes based on the gradient values, merging the list of strokes, defining a list of corners using the list of strokes, and defining an image area rectangle delimiting the image area using the list of corners and the list of strokes. The image area rectangle can be used to define a binding box for extracting the image area from the digital image. The method enables the automatic detection of multiple image areas in a digital image. Moreover, the method implements a robust algorithm for image area detection such that even imperfect image areas can be detected without errors.

32 Claims, 21 Drawing Sheets

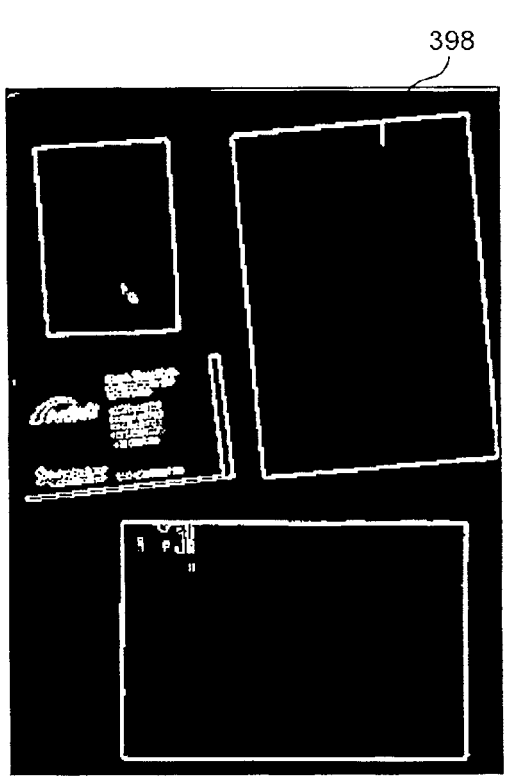
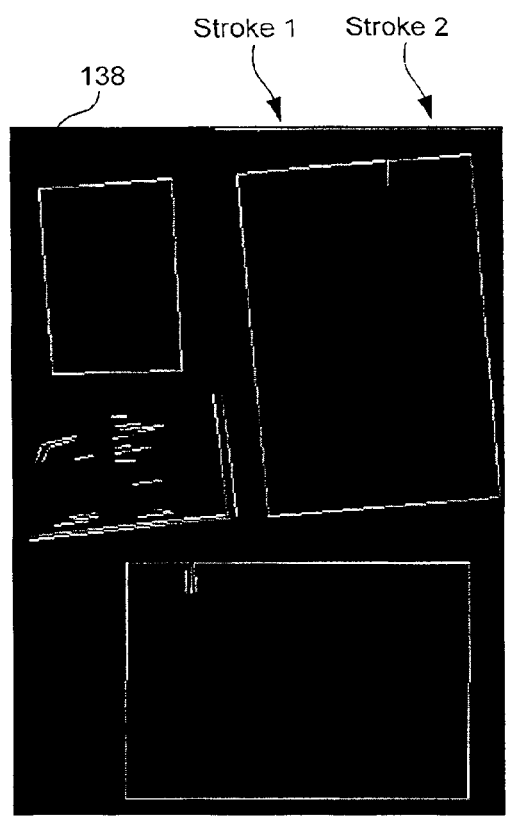
Figure 15     Figure 16

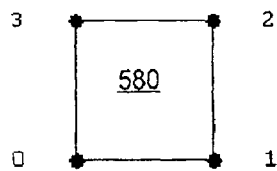
Examples:
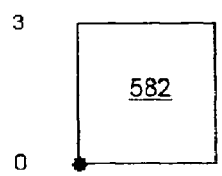
CONFIG_1000
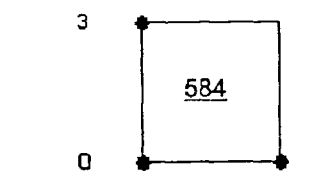
CONFIG_1101a
for corners 0-1-3
CONFIG_1101b
for corners 0-3-1
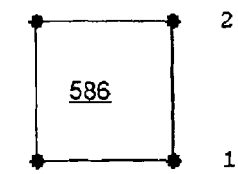
CONFIG_1111
*Figure 25*
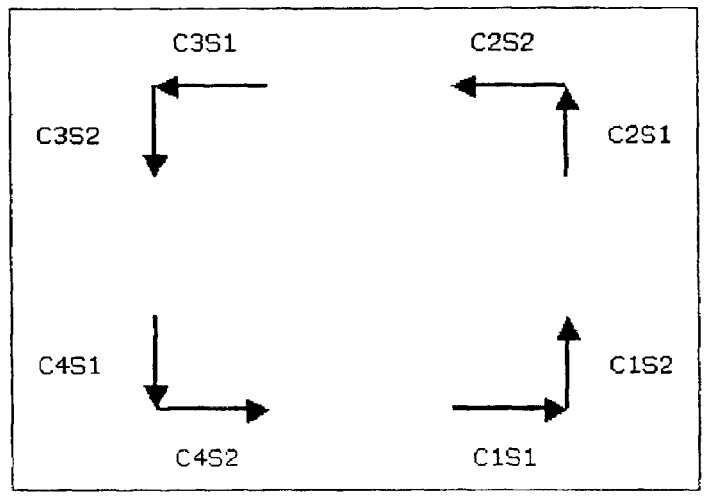
*Figure 26*

MULTIPLE IMAGE AREA DETECTION IN A DIGITAL IMAGE

BACKGROUND OF THE INVENTION

1. Field of the Invention

The invention relates to image processing, and more particularly to a method for detecting multiple image areas in a digital image.

2. Description of the Related Art

With the advent of digital cameras and scanners, digital photography is becoming more popular and accessible to consumers. Digital images are often created either by capturing a scene using a digital camera or digitizing a traditional film-based photograph using a scanner. Digital photography has many advantages over the traditional film-based photography. One particular advantage is that digital images can be easily manipulated or edited for better presentation. Furthermore, the digital images can be readily distributed over electronic media such as the internet or electronic mail.

When a scanner is used to create a digital image from a film-based photograph, often the user has to scan in each photograph separately because most scanners treat each scan page as one picture. If multiple photographs are scanned in at the same time, the entire scan page is treated as one image and individual photographs cannot be readily separated into individual image files. Because the scan process can be very slow, often up to a few minutes per scan page, it is very time consuming to scan a large number of photographs individually. Because film-based photographs are usually 3" by 5" or 4" by 6" and because the scan page is typically large enough to accommodate more than one such photographs, it is desirable to scan multiple photographs at a time to speed up the scanning process.

Presently, when a scanned image is created including multiple photographs, the individual photographs can be extracted using commonly available photo editing tools. Often, the process requires the user to manually extract each photograph from the scanned image to generate separate image files for each individual photograph. Such manual cropping may be a complicated and time consuming process in itself. Furthermore, most photo editing tools may limit the crop area to a certain shape, such as an upright rectangular binding box. In that case, the user must ensure that the photographs are aligned properly on the scanner before scanning so that individual photographs will fit properly inside the cropping rectangle.

A scanner with batch scan capability allowing the user to scan multiple images in one scan job has been introduced. It is desirable to provide a method for automatically detecting and extracting individual photographs from a digital image containing multiple photographs. Such algorithm should be able to perform such automatic detection effectively so that manual intervention is entirely eliminated.

SUMMARY OF THE INVENTION

According to one embodiment of the present invention, a method for detecting an image area in a digital image including the image area and a background area is disclosed. The digital image is represented as a two-dimensional array of pixel values. The method includes identifying in the digital image a first image region indicative of the background area and a second image region indicative of the image area, and computing gradient values using the pixel values for pixel locations in the digital image associated with a boundary between the first image region and the second image region.

The method further includes defining a list of strokes based on the gradient values. Each stroke is a line segment having a start pixel location and an end pixel location. Each stroke is derived from a region of pixel locations having non-zero gradient values of the same sign. Pixel locations to a first side of each stroke are in the second image region and pixel locations to a second side of each stroke are in the first image region.

The method further includes merging the list of strokes. In operation, a first stroke and a second stroke in the list of strokes are merged when the first and second strokes are collinear and a start pixel location of one of the first and second strokes is near an end pixel location of the other one of the first and second strokes.

The method then includes defining a list of corners using the list of strokes. Each corner is a pixel location of an intersection of a third stroke and a fourth stroke. The third stroke and the fourth stroke form a corner when the third stroke is perpendicular to the fourth stroke, the third and fourth strokes are arranged in a third direction, and a start pixel location of one of the third and fourth strokes is close to an end pixel location of the other one of the third and fourth strokes.

Lastly, the method includes defining an image area rectangle delimiting the image area using the list of corners and the list of strokes. The image area rectangle is defined based on one or more corners fitting a predefined corner configuration and one or more strokes associated with the corners. The strokes forms at least a portion of a perimeter of the image area rectangle.

The present invention is better understood upon consideration of the detailed description below and the accompanying drawings.

BRIEF DESCRIPTION OF THE DRAWINGS

FIG. 15 is an image of the pFlag image file illustrating the pixel locations which have been traced in the stroke detection process.

FIG. 16 is an image illustrating the multiple strokes detected and defined by the stroke detection process.

FIG. 25 illustrates several exemplary corner configurations used in the rectangle detection process according to one embodiment of the present invention.

FIG. 26 illustrates the convention used in the present embodiment to describe the incoming and outgoing strokes at each corner in a rectangle.

In the present disclosure, like objects which appear in more than one figure are provided with like reference numerals.

DETAILED DESCRIPTION OF THE PREFERRED EMBODIMENTS

Figure 1:
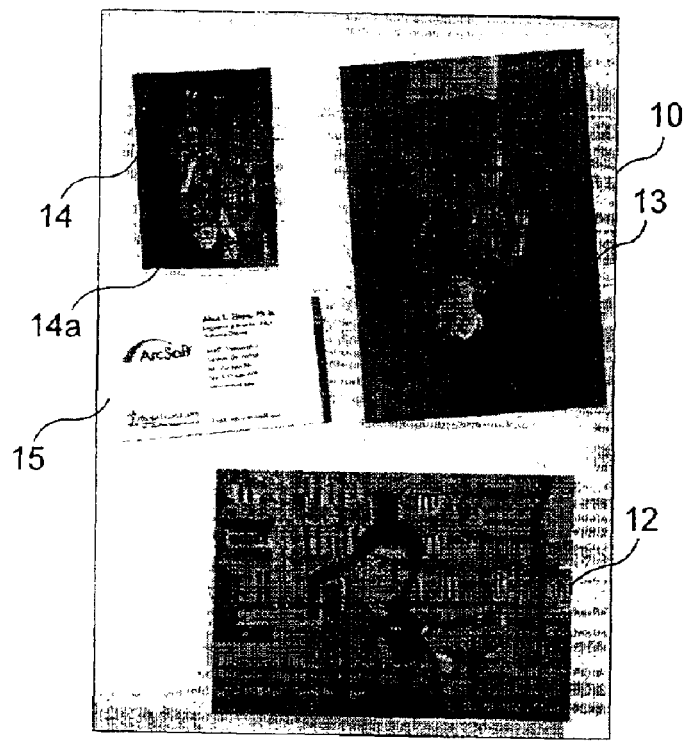
FIG. 1 is an exemplary scanned digital image including multiple image areas.

In accordance with the principles of the present invention, a method for detecting an image area in a digital image including the image area and a background area and defining an image area rectangle delimiting the image area is disclosed. The image area detection method uses gradient information of the digital image to define strokes and corners which are used, in turn, to define the image area rectangle. The image area rectangle can be used to define a binding box for extracting the image area from the digital image so that the image area can be made into an individual image file. The method of the present invention enables automatic detection of multiple image areas in a digital image, thereby alleviating the need for the time-consuming task of manually cropping multiple image areas. More importantly, the method of the present invention implements a robust algorithm for image area detection such that even imperfect image areas can be detected without errors. The image area detection method of the present invention can consistently provides accurate and reliable image detection results, despite the conditions of the digital image.

The image area detection method of the present invention operates on a digital image which is typically represented as a two-dimensional array of pixel values. If the digital image is a color image, each pixel value typically consists of three pixel values representing the three primary colors (such as red, green, blue). The digital image can be generated in any number of ways, such as by a digital camera or a scanner. The digital image can be stored in any conventional digital image format, such as TIFF, JPEG and Bitmap (.bmp) formats. In the preferred embodiment of the present invention, the digital image is stored in the Bitmap format. Techniques for converting TIFF or JPEG image files to Bitmap format are well known in the art of image processing. The size and resolution of the digital image may vary depending on the application which created the image. In the case of a letter size digital image created by a scanner with a 300 dpi resolution, the digital image can be approximately 2200 pixels wide by 3000 pixels long.

The image area detection method of the present invention operates on a digital image including one or more image areas. The image areas may contain with a variety of image content, such as photographs, drawings and text (e.g. a business card). The algorithm implemented in the image area detection method is designed to be very robust so as to detect image areas presented under a variety of conditions. For instance, an image area can be positioned askew relative to the orientation of the digital image. The image area may include slant edges and thus is not a proper rectangular area. Specifically, the robustness of the algorithm allows even imperfect image areas to be detected. In the present description, an imperfect image area is an image area without distinct or complete boundaries. Missing boundaries can occur when an image area is white in color near one or more boundaries of the image area. Imperfect image areas also include image areas where one image area overlaps another image area. As long as sufficient areas of the overlapped image areas are exposed, the method of the present invention can still operate to define the boundary of each overlapped image area.

In the present embodiment, the image area detection method is able to detect an imperfect image area if the following two limitations are met. First, if an image area is positioned askew, the image area should not be positioned more than 30 degrees askew relative to the digital image. This limitation is imposed to ensure that the gradient calculation process can determine a primary orientation (horizontal or vertical) of the boundary of the image area, as will be explained in more detail below. Second, two image areas cannot be positioned too close to each other. In one embodiment, the space between the image areas should be larger than 1 to 2 percent of the width or height of the digital image. For example, if the digital image is 2000×3000 pixels, the space between the image areas should be more than 20 pixels. This limitation is imposed because in the image area detection method, the digital image is resized to an image having a lower resolution to enhance the processing efficiency. A gap between two image areas that is too small may become indistinguishable in the resized lower-resolution image.

The image area detection method of the present invention generates as output a list of coordinates defining image area rectangles where each rectangle delineates the boundary of an image area. In the preferred embodiment, the image area rectangle is defined by the coordinates of the pixel locations of the rectangle's four corners. In the present description, a rectangle includes a parallelogram with the adjacent sides of unequal length or all fours sides of equal length (i.e., a square).

The image area detection method of the present invention has numerous applications in image processing. One application where the method of the present invention can be particularly useful is the detection of multiple photographs in a scanned image. As mentioned above, the scanning of a page of document (a scan job) can be a very slow process. Therefore, scanning of multiple photographs can be very time consuming if each photograph has to be scanned separately. In accordance with the present invention, a user may scan multiple photographs at each scan job and use the image area detection method of the present invention to automatically detect and extract the individual photographs. In this manner, the method of the present invention can greatly improve the user experience by reducing the time needed to scan a large number of photographs.

FIG. 1 is an exemplary scanned digital image including multiple image areas. Referring to FIG. 1, digital image 10 is generated in one scan job by placing various image objects (photographs and a business card) on a scanner. As a result of the scanning process, digital image 10 is created as a letter size image containing four image areas 12–15 on a background area which is typically white. Digital image 10 may have a resolution of 2000 pixels by 3000 pixels.

Digital image 10 is provided to illustrate the various conditions under which a digital image can be created. In FIG. 1, image area 12 is a photograph and is placed upright and in a proper orientation with respect to the boundary of digital image 10. On the other hand, image areas 13 and 14 are two other photographs that are placed askew and do not align with the boundaries of digital image 10. Because of the misalign orientation, image areas 13 and 14 are typically difficult to extract using conventional image editing tools. Image area 14 includes an additional imperfection in that the photograph has a cropped edge (edge 14a) and thus the image area is not a perfect rectangle. Finally, image area 15 is a business card having a white background color similar to the background color of digital image 10. Consequently, in the scanning process, one or more boundaries of the business card may not be detected or may not be distinguishable from the background of digital image 10. As shown in FIG. 1, the top and left edges of image area 15 are almost indistinguishable from the background of digital image 10. Although digital image 10 is described as a scanned image in the present description, digital image 10 is representative of any digital image generated using any means presently known or to be developed.

Figure 2:
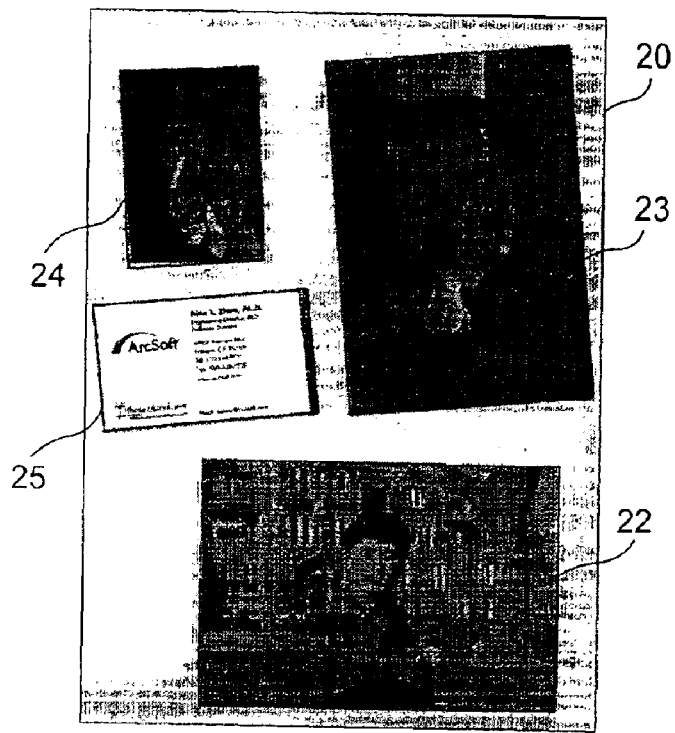
FIG. 2 illustrates the digital image of FIG. 1 with image area rectangles defined using the image area detection method according to one embodiment of the present invention.

FIG. 2 illustrates the digital image of FIG. 1 with image area rectangles defined using the image area detection method according to one embodiment of the present invention. After the operation of the image area detection method of the present invention, four image area rectangles 22–25 delimiting the boundaries of image areas 12–15 are generated. FIG. 2 illustrates the robustness of the image area detection method of the present invention. An image area rectangle can be defined when an image area is upright (image area rectangle 22) or when an image area is askew (image area rectangle 23). An image area rectangle can be defined even when one of the edges of the image area is not straight (such as image area rectangle 24). Lastly, an image area rectangle can be defined even when one or more boundaries of an image area are missing (such as image area rectangle 25). The image area detection method of the present invention will now be described in detail with reference to FIGS. 3–29.

Method Overview

Figure 3:
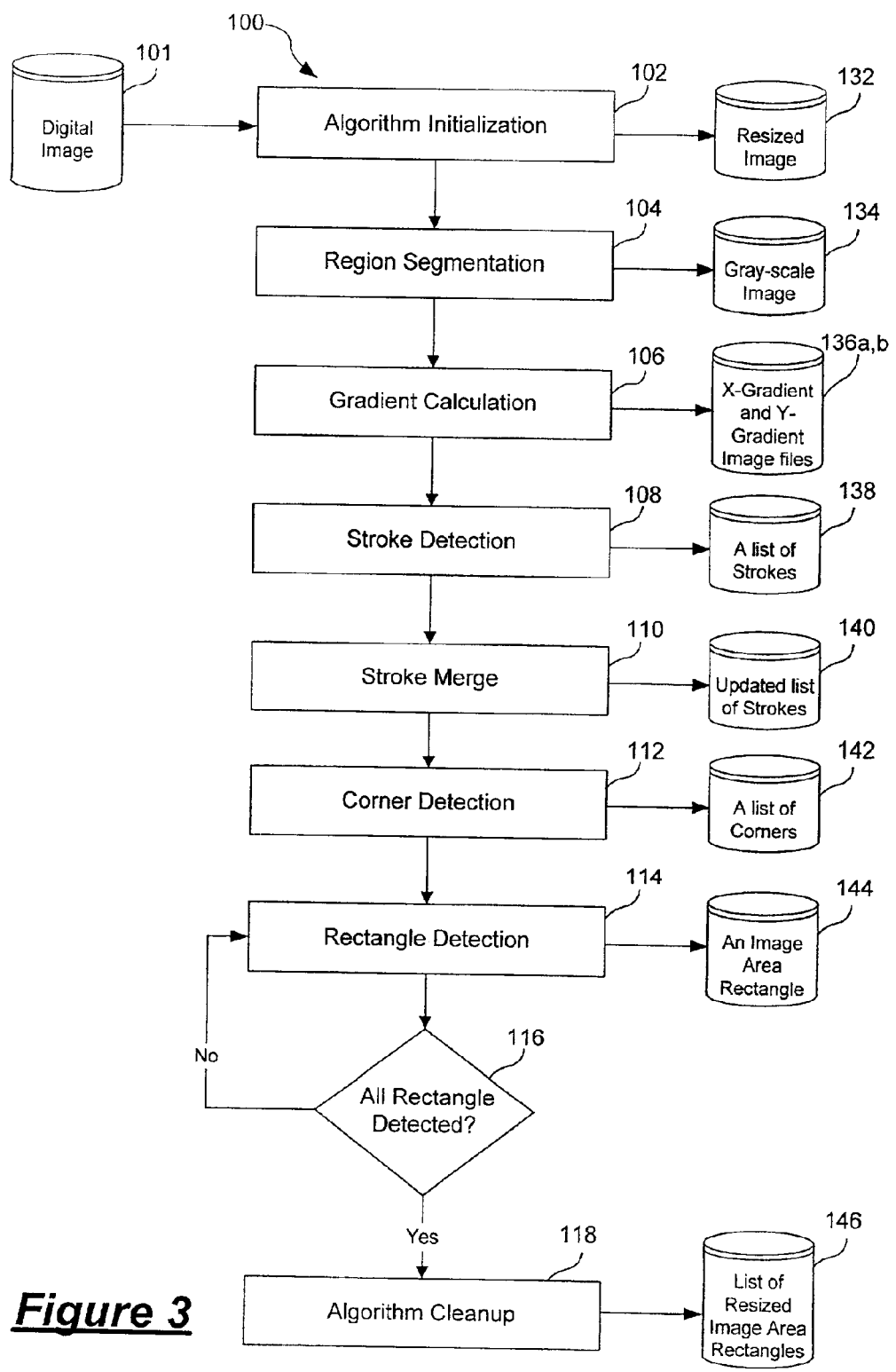
FIG. 3 is a flowchart illustrating an image area detection method according to one embodiment of the present invention.

FIG. 3 is a flowchart illustrating an image area detection method 100 according to one embodiment of the present invention. First, an overview of the image area detection method will be provided. The operation of each step in the method will be described in more detail below.

Method 100 begins with an algorithm initialization process 102 which receives as input a digital image file 101. In the present description, digital image file 101 contains digital image 10 of FIG. 1 in bitmap format. Algorithm initialization process 102 generates a resized image 132 which is a reduced resolution image of digital image 10. Resized image 132 is used as a proxy for digital image 10 in all of the subsequent steps of method 100.

Method 100 proceeds with a region segmentation process 104 which operates to segment resized image 132 into image area region or background area region. The result of process 104 is a gray-scale image file 134 containing the segmentation information.

Then, method 100 performs a gradient calculation process 106. Gradient measures the amount of change in pixel values at a pixel location. Gradient values in both the horizontal and vertical directions are computed. Large image gradients usually occur throughout an image area. However, the gradient values of interest are those that are located at or near the boundary of the image area region and the background area region. The gradient values at or near the boundary of the image area region and the background area region can be used as an indicator of the edges of the image areas. Process 106 generates an x-Gradient image file 136a and a y-Gradient image file 136b.

Having obtained the gradient information, method 100 proceeds to a stroke detection process 108 for defining a set of strokes demarcating the boundary of the image area region and the background area region of resized image 132. In the present description, a stroke is a line segment with a start point and an end point. The start point and end point can be expressed as coordinates of pixel locations in resized image 132. A further constraint is imposed on the definition of a stroke to ensure that all strokes conform to the same orientation. Thus, in the present description, a stroke is defined such that when viewed from the start point to the end point, pixel locations on the left side of a stroke are located in the image area region while pixel locations on the right side of the stroke are located in the background area region. Process 108 generates a list of strokes 138 defined by the pixel locations of the start and end points of each stroke.

Next, a stroke merge process 110 is performed to attempt to merge as many of the strokes defined in process 108 as possible. Specifically, two strokes are merged when they are collinear and the start point of one is near the end point of another. The merging of strokes are carried out so that, as much as possible, each stroke is made to demarcate one edge of an image area. The result of process 110 is an updated list of strokes 140.

Next, using the strokes defined in process 110, method 100 proceeds to a corner detection process 112. A corner is defined as a pixel location where two strokes are perpendicular to each other, are oriented in a counter-clockwise manner and have start/end points which are sufficiently close. Process 112 defines a list of corners 142 which are used as possible vertexes of the image area rectangles to be defined.

Finally, having defined a list of strokes 140 and a list of corners 142, method 100 now proceeds to a rectangle detection process 114. Process 114 uses the locations of the corners and the strokes associated with each corner to determine possible configurations of an image area rectangle. After an image area rectangle with the best likelihood value has been selected, the corners and strokes associated with that image area rectangle are removed from the lists.

Method 100 repeats process 114 until all image area rectangles have been detected (step 116). Process 114 generates a list of image area rectangles 144 defined by the pixel locations of each rectangle's vertexes.

At the conclusion of rectangle detection process 114, method 100 performs a algorithm cleanup process 118 which, among other things, resizes the image area rectangles to the image size of the original digital image 10. Thus, process 118 generates a list of resized image area rectangles 146 defining the boundary of image areas in digital image 10 as shown in FIG. 2. The list of image area rectangles 146 can used by any image editing tool to extract each individual image area from digital image 10 so that each individual image area becomes its own image file.

The steps in method 100 will now be described in detail.

Algorithm Initialization

Figure 4:
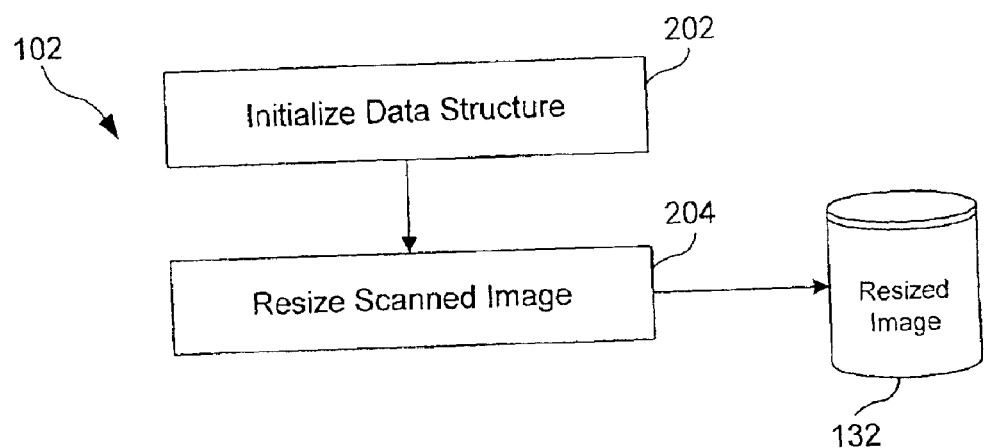
FIG. 4 is a flowchart illustrating the algorithm initialization process of the image area detection method according to one embodiment of the present invention.

FIG. 4 is a flowchart illustrating the algorithm initialization process of the image area detection method according to one embodiment of the present invention. Referring to FIG. 4, algorithm initialization process 102 includes two steps. First, at step 202, data structure used by method 100 is initialized. The specific data structure used at each of the steps in method 100 will be described with reference to each respective step in method 100. When method 100 is implemented in software, initialization of data structure can be implemented using conventional software techniques.

Figure 5:
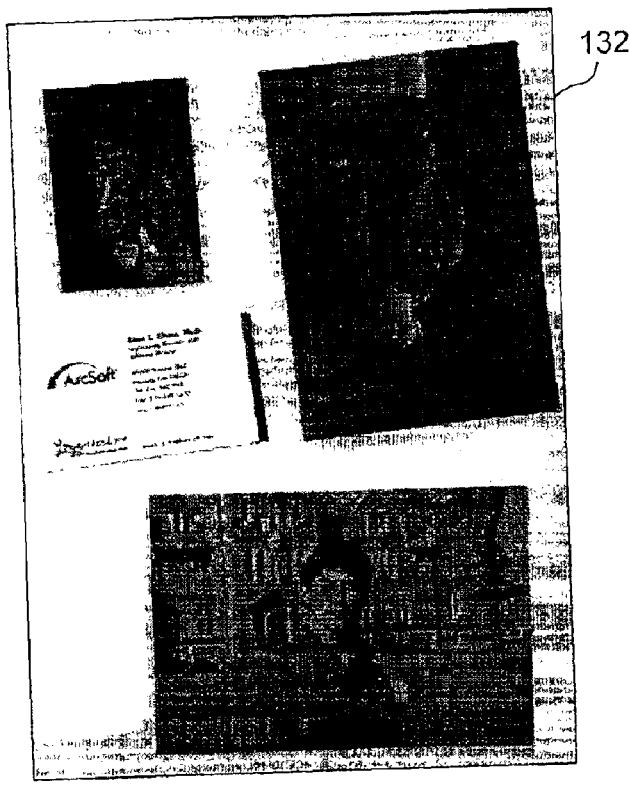
FIG. 5 is a resized image of the digital image of FIG. 1 having a lower image resolution than the image in FIG. 1.

Then, at step 204, digital image 10 defined by digital image file 101 is resized to a resized image 132 having reduced resolution. As described above, most digital images, such as scanned digital image 10, can include a few thousand or more pixels in width and in height. To reduce the computational burden and improve the processing efficiency in subsequent steps of method 100, digital image 10 is resized to a resized image having reduced resolution. In one embodiment, the resized image has a resolution of 256×256 pixels to 512×512 pixels. The reduced resolution can be obtained by averaging between a neighborhood of pixels, such as a 2×2, 4×4 or 8×8 neighborhood of pixels. Resized image 132 having lower image resolution than digital image 10 is shown in FIG. 5. In the present embodiment, resized image 132 has a resolution of 282×390 pixels, reduced from digital image 10 which has a resolution of 2261×3122 pixels.

Region Segmentation

In a scanned image such as digital image 10, the image generally consists of a bright background area whose color is very close to white. An image area within digital image 10, containing photographs or other images, is generally not entirely white in color. By using this heuristic, an image area can be defined as an area containing non-white pixel values. Accordingly, at region segmentation process 104, resized image 132 can be segmented into a background area region and an image area region based on the color of each pixel location.

Figure 6:
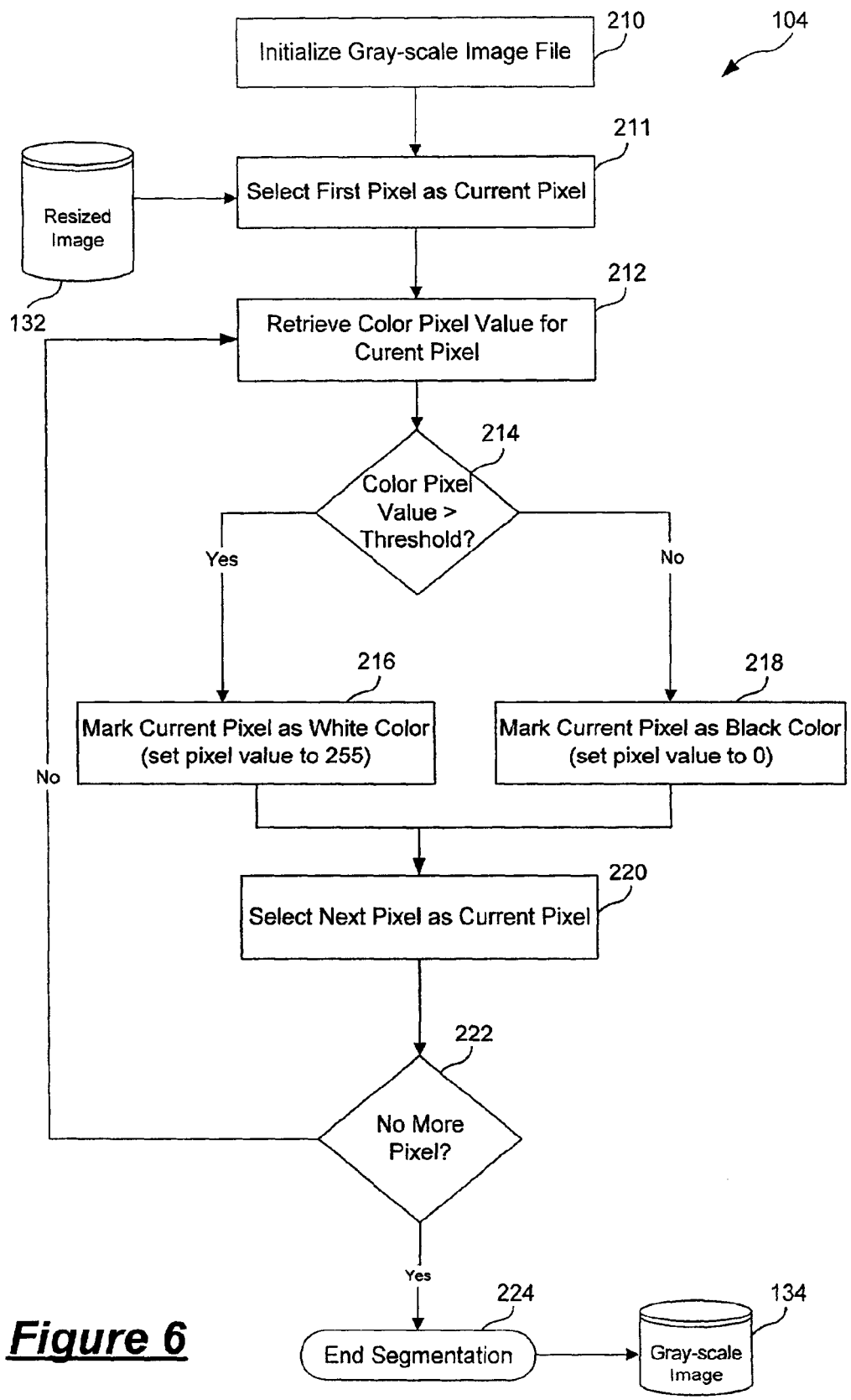
FIG. 6 is a flowchart illustrating the region segmentation process of the image area detection method according to one embodiment of the present invention.

FIG. 6 is a flowchart illustrating the region segmentation process of the image area detection method according to one embodiment of the present invention. First, at step 210, a gray-scale image file 134 for storing the segmentation result is initialized. Gray-scale image file 134 has the same size (282×390 pixels) as resized image 132 and each pixel location in gray-scale image file 134 is represented by one color value only (typically one byte of data or 8-bit). Each pixel location in image file 134 corresponds to the respective pixel location in resized image 132 and thus image file 134 is used as a flag to mark the result of the segmentation process for each pixel location in resized image 132.

Region segmentation process 104 operates on resized image 132. At step 211, a first pixel in resized image 132 is selected as the current pixel. Note that in the present description, all image files, including resized image 132, are stored in the bitmap format so that pixel values are stored in a traversal order of lower-left corner to upper right corner in the digital image, which pixel traversal order will be used throughout the present description.

At step 212, the color pixel value for the current pixel is retrieved from resized image 132. In the present description, the term "color pixel value" refers to the pixel value of a color pixel including pixel values for the three primary color components. In most applications, the three primary color components are red, green and blue. Each color pixel value can be expressed in 8-bit or more. A color pixel is white in color when the pixel values of the three color components are each at its maximum value (i.e., 255 for an 8-bit pixel value). On the other hand, a color pixel is black in color when the pixel values for the three color components are each zero. In the present description, an 8-bit pixel value is assumed.

At step 214, the color pixel value of the current pixel is compared with a predefined threshold value to determine if the current pixel is white in color. For an 8-bit pixel value, a threshold of 190 or larger can be used to segregate the white pixels from the other color pixels. In operation, at step 214, the pixel value for each color component (red, green and blue) is individually compared with the threshold value. If the pixel values of all three color components are greater than the threshold value, then the current pixel is classified as a white color pixel (step 216). The result is recorded in gray-scale image file 134 by setting the pixel value for the current pixel in gray-scale image file 134 to 255. If the pixel values for any one of the three color components is less than the threshold value, then the current pixel is classified as a black color pixel (step 218). The result is recorded in gray-scale image file 134 by setting the pixel value for the current pixel in gray-scale image file 134 to 0.

Process 104 continues by selecting the next pixel as the current pixel (step 220). As long as there are pixels to be processed, steps 212 to 220 will be repeated to classify each pixel location as either white or black, corresponding to either the background area or the image area respectively. When all the pixels in resized image 132 have been processed (step 222), region segmentation process 104 is completed (step 224) and gray-scale image file 134 containing the segmentation information is created.

Figure 7:
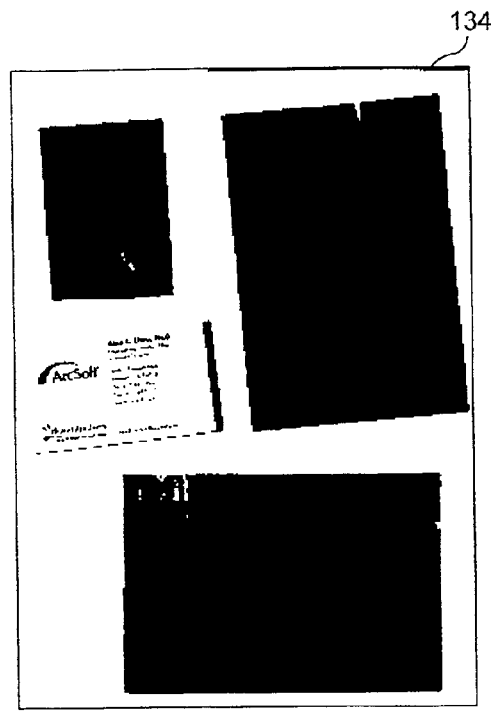
FIG. 7 illustrates the gray-scale image file generated as a result of the operation of the region segmentation step on the resized image of FIG. 5.

FIG. 7 illustrates the gray-scale image file 134 generated as a result of the operation of the region segmentation step on resized image 132. Referring to FIG. 7, white area in gray-scale image file 134 represents potential background area in digital image 10 while black area in gray-scale image file 134 represents potential image areas. For example, image areas containing the three photographs in digital image 10 are marked as black in image file 134. The image area containing the business card is identified as white because the business card is white in color itself. As can be seen in the following description, the image area detection method of the present invention is capable of detecting an image area even though the image area contains substantially white color.

Gradient Calculation

Figure 8:
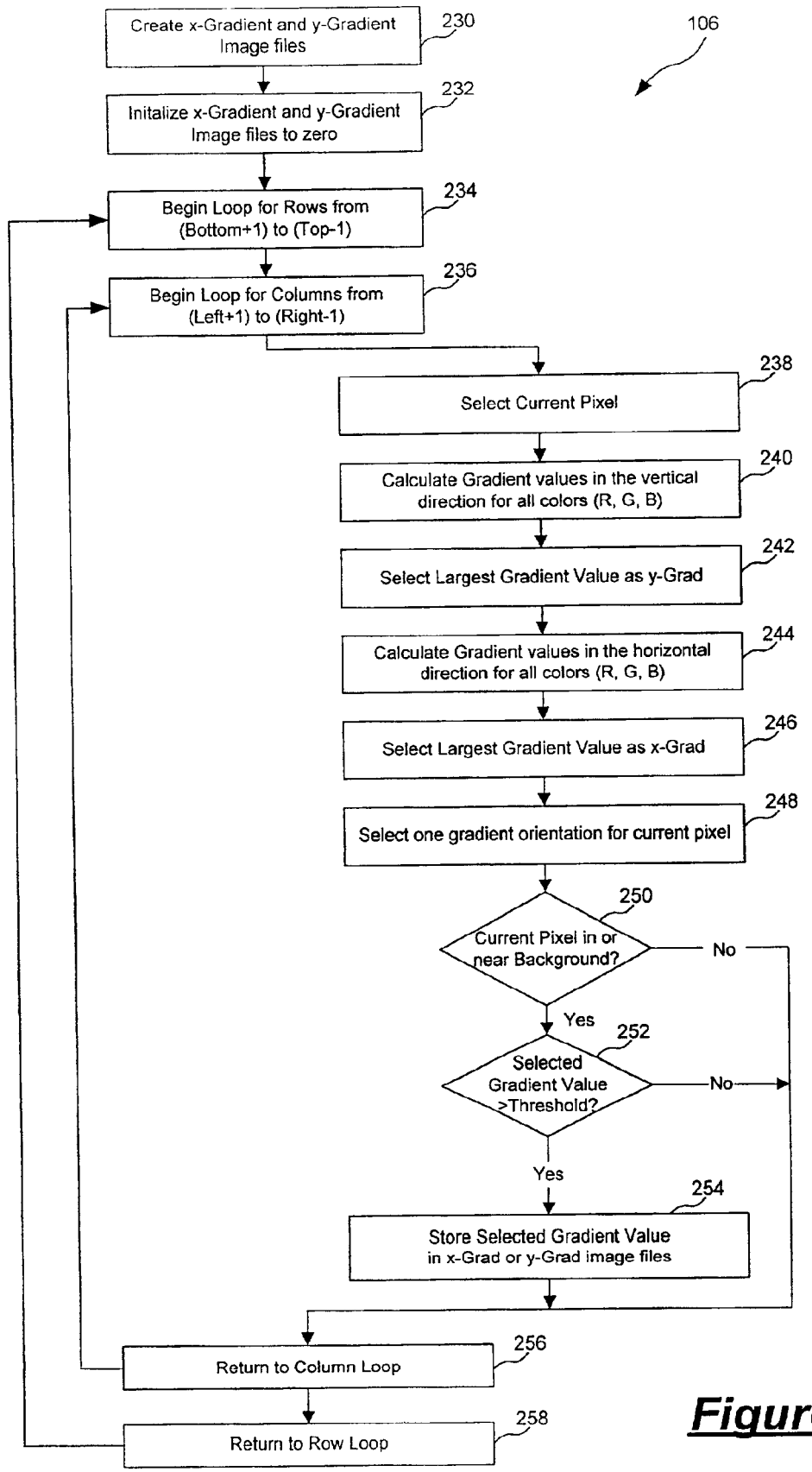
FIG. 8 is a flowchart illustrating the gradient calculation process of the image area detection method according to one embodiment of the present invention.

Referring to FIG. 3, after identifying the background area region and the image area region of resized image 32 in process 104, method 100 proceeds to gradient calculation process 106 to compute gradient values for each pixel location in resized image 132. FIG. 8 is a flowchart illustrating the gradient calculation process of the image area detection method according to one embodiment of the present invention.

Image gradient measures the degree of change in pixel values at a given pixel location in an image. A large gradient value indicates a large change in color or brightness in the image. Therefore, gradient information can be used to identify the boundaries between a background area and an image area because such boundaries are characterized by significant color changes. In image processing art, boundaries of large gradient changes are referred to as "edges." Image gradient, and thus image edges, can occur in both the horizontal or the vertical direction. In accordance with the present invention, gradient values are computed for detecting horizontal and vertical image edges in resized image 132. These edges are used as evidence of boundaries between image areas and the background area.

In addition to the boundaries between image areas and the background area, texture and contents inside an image area (such as a photograph) can generate large image gradient, and consequently, a large number of edges. The large number of edges within an image area can obscure the actual boundaries the image area detection method is trying to identify. Therefore, in accordance with the present invention, the gradient information is used in conjunction with the segmentation information previously determined so that only gradient information that are indicative of potential boundaries between an image area and a background area are retained. Gradient information that occurs within a potential image area are discarded. In this manner, the method of the present invention can provide a robust image area detection result.

Note that an image gradient occurring in the horizontal direction generates an edge which is in the vertical direction, and vice versa. In the following description, the term "x-Grad" is used to refer to gradient values in the horizontal direction and thus represents edges that are in the vertical direction (y-Edge). On the other hand, the term "y-Grad" is used to refer to gradient values in the vertical direction and thus represents edges that are in the horizontal direction (x-Edge).

Referring to FIG. 8, gradient calculation process 106 begins by creating two image files for storing the result of the calculation (step 230). Specifically, an x-Gradient image file 136a for storing gradient values in the horizontal direction and a y-Gradient image file 136b for storing gradient values in the vertical direction are created. Image files 136a and 136b are each a gray-scale image file in the bitmap format. Thus, each pixel location in each of image files 136a and 136b contains one-byte of data indicative of the gradient values computed. At step 232, all values in image files 136a and 136b are initialized to zero. Therefore, any pixel location without significant gradient will appear as black color in the x-Gradient or y-Gradient image files.

At step 234, gradient calculation process 106 begins a loop to step through all rows of pixel values in resized image 132 except the bottommost and topmost rows of pixels. At each row, step 236 begins a loop to step through all columns of pixel values in resized image 132 except the leftmost and the rightmost columns. Gradient calculation are not carried at the perimeter of resized image 132 because, by definition, there is no image gradient at these perimeter pixel locations.

At step 238, the current pixel is selected. The gradient value in the vertical direction (y-Grad) for the current pixel is computed (step 240). A gradient value is computed for each of the color components (red, green and blue) of the current pixel. In the present embodiment, the gradient value is computed based on the pixel values of the two neighboring pixels of the current pixel. The following equation is used to compute the gradient value in the vertical direction:

$$G_y(x, y) = \frac{I(x, y+1) - I(x, y-1)}{2}, \quad \text{Eq. (1)}$$

where $G_y(x,y)$ is the y-Grad value for the current pixel having a coordinate of (x,y), and I(x,y) represents the pixel value for a specific color at a coordinate of (x,y). Thus, to compute the y-Grad value, the pixel values for the pixel above and the pixel below the current pixel are used. Referring to Equation (1), the gradient value thus computed is a signed value. Specifically, a positive gradient value results if the change is from a lighter color to a darker color (e.g., from white to black) from top to bottom. Meanwhile, a negative gradient value results if the change is from a darker color to a lighter color (e.g., from black to white) from top to bottom. Therefore, the sign of the gradient value can be used to indicate the direction of the color change in the image.

At step 240, Equation (1) is used to compute y-Grad values for the red, green and blue color components of the current pixel. The largest gradient value among the three color gradient values is selected as the y-Grad value (step 242). In the present embodiment, the largest gradient value is obtained by comparing the absolute value of the three color gradient values.

Gradient calculation process 106 then proceeds to compute the horizontal gradient value (x-Grad) for the current pixel (step 244). Similar to step 240, a gradient value is computed for each of the color components (red, green and blue) of the current pixel. The following equation is used to compute the gradient value in the horizontal direction:

$$G_x(x, y) = \frac{I(x+1, y) - I(x-1, y)}{2}, \quad \text{Eq. (2)}$$

where $G_x(x,y)$ is the x-Grad value for the current pixel having a coordinate of (x,y), and I(x,y) represents the pixel value for a specific color at a coordinate of (x,y). To compute the x-Grad value, the pixel values for the pixel to the right and to the left of the current pixel are used. Similar to the y-Grad value, the x-Grad value is a signed value where a positive gradient value indicates changes from a lighter color area to a darker color area from right to left. A negative gradient value indicates changes from a darker color area to a lighter color area from right to left.

At step 244, Equation (2) is used to compute x-Grad values for the red, green and blue color components of the current pixel. The largest gradient value among the three color gradient values is selected as the x-Grad value (step 246). In the present embodiment, the largest gradient value is obtained by comparing the absolute value of the three color gradient values.

While the current pixel can have image gradient in both the horizontal and vertical direction, process 106 selects the stronger gradient value in either one of the two directions as the correct gradient orientation for the current pixel (step 248). In the present embodiment, the selection process is as follows. If the absolute value of the x-Grad value is greater than the absolute value of the y-Grad value, then the x-Grad value is selected and the y-Grad value is set to zero. On the other hand, if the absolute value of the x-Grad value is less than the absolute value of the y-Grad value, then the y-Grad value is selected and the x-Grad value is set to zero.

As described above, large gradient values occur at the boundaries of an image area and the background area and also occur frequently within an image area. Process 106 uses the segmentation information obtained in process 104 advantageously to discard gradient values that are within an image area and thus do not contribute to the detection of the image area boundaries. At step 250, process 106 determines if the current pixel is in or near the background area region as defined by the segmentation result in gray-scale image file 134. In the present embodiment, a pixel is "in or near" the background area region if the pixel is in the background area region of image file 134 or if the pixel is in the image area region of image file 134 but is only one pixel away from the background area region. In one embodiment, step 250 is implemented by extracting the segmentation results of an 3×3 neighborhood of pixels surrounding the current pixel. If any one of the pixels in the 3×3 neighborhood of pixels is white (i.e., segmentation result is 255), then the current pixel is considered to be "near" the background area region. If none of the pixels in the 3×3 neighborhood of pixels is white, the current pixel is not in or near the background area region. Therefore, the gradient value computed for the current pixel is discarded and process 106 continues at step 256.

If the current pixel is in or near the background area region, then process 106 continues to step 252 where the selected gradient value (either x-Grad or y-Grad) is compared with a threshold value. The threshold value is selected so that only significant gradient information is stored. Step 252 operates to eliminate small gradient values resulted from minor image texture or color changes. In the present embodiment, a threshold value of 12 (in terms of an 8-bit pixel intensity value) is used. By applying a threshold value in the gradient calculation process, process 106 can effectively eliminate false image edges and retain most of the true image edges associated with the boundaries of image areas and the background area.

If the selected gradient value is greater than the threshold value, the selected gradient value (either x-Grad or y-Grad) is stored in the respective x-Gradient or y-Gradient image file (step 254). Otherwise, the gradient value is not stored.

Process 106 continues with the next pixel in the next column of the current row of pixels (step 256). If all the pixels in the current row has been processed, process 106 continues with the next pixel in the next row (step 258) until all the pixels, except those at the perimeters, in resized image 132 have been processed.

Figure 9A:
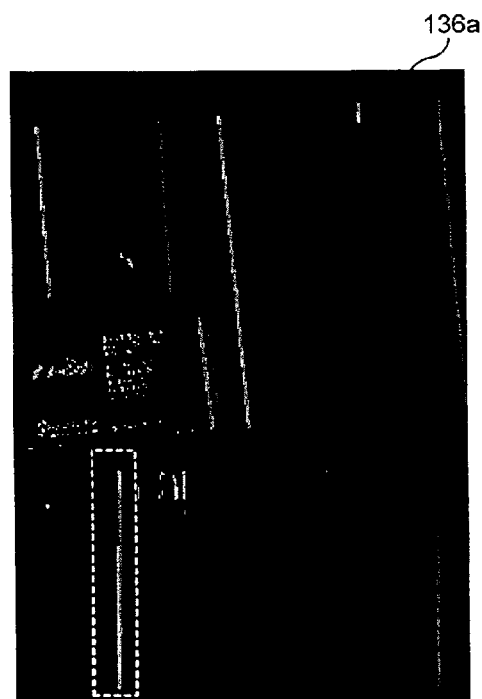
FIGS. 9a and 9b illustrate the x-Grad image file and the y-Grad image file corresponding to the resized image of FIG. 5.
Figure 9B:
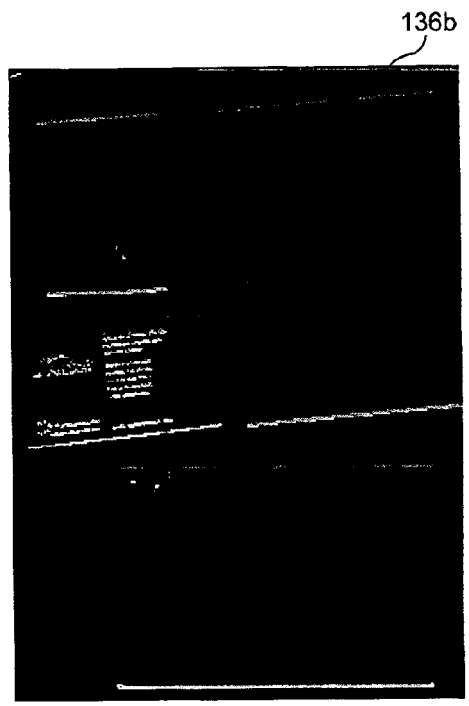

Gradient Calculation process 106 generates x-Gradient image file 136a containing the horizontal gradient information and y-Gradient image file 136b containing the vertical gradient information. FIGS. 9a and 9b illustrate the x-Gradient image file and the y-Gradient image file corresponding to the resized image of FIG. 5. As described above, horizontal gradient information is evidence of vertical image edges while vertical gradient information is evidence of horizontal image edges. Thus, in FIG. 9a, the x-gradient values result in vertical lines indicative of vertical image edges between the image areas and the background area. On the other hand, in FIG. 9b, the y-gradient values result in horizontal lines indicative of horizontal image edges between the image areas and the background area. The vertical and horizontal gradient values computed in gradient calculation process 106 are strong evidence of boundaries between image areas and the background area.

As shown in FIGS. 9a and 9b, each pixel location in resized image 132 is represented either by a vertical edge (white color in FIG. 9a) or a horizontal edge (white color in FIG. 9b) or an non-edge (black color in FIGS. 9a and 9b). Also, the brightness level of the image edges in FIGS. 9a and 9b indicates the direction of the image gradient. Recall that the gradient value is a signed value. A positive value indicates a gradient from a light color (e.g. the background) to a dark color (e.g. an image area) from top to bottom or from right to left. A negative value indicates a gradient from a dark color (e.g. an image area) to a light color (e.g. the background) from top to bottom or from right to left.

Because images in FIGS. 9a and 9b display the absolute value of the gradient values, absolute values of negative gradient values are generally greater than positive gradient values and thus appear brighter in FIGS. 9a and 9b. Therefore, the bright edges in FIGS. 9a and 9b represent the bottom or left boundaries of the image areas while the darker edges represent the top or right boundaries of the image areas.

Stroke Detection

Returning again to FIG. 3, after gradient calculation process 106, method 100 proceeds to stroke detection process 108. Stroke detection process 108 operates to define a set of strokes based on the gradient information computed in process 106. The strokes thus defined represent the boundaries between the image areas and the background area in resized image 132.

As described above, a stroke is a line segment with a start point and an end point. The start point and end point are expressed as coordinates of pixel locations in resized image 132. A further constraint is imposed on the definition of a stroke to ensure that all strokes conform to the same orientation. Thus, in the present description, a stroke is defined such that when viewed from the start point to the end point, pixel locations on the left side of a stroke are located in an image area region while pixel locations on the right side of the stroke are located in the background area region. Thus, when a number of strokes traces the boundary of an image area, the strokes will be aligned in a counter-clockwise direction.

Referring to FIGS. 9a and 9b, the gradient values provide evidence of image edges in resized image 132. However, these image edges formed many disjointed regions. For example, in the dotted-line box 260 in FIG. 9a, the gradient values computed include several disjointed edge areas. These individual edge areas actually form the left boundary of image area 12 containing a photograph. Stroke detection process 108 operates to detect these disjointed edge areas and group the appropriate edge areas into a line segment. A stroke thus formed is indicative of a boundary between an image area and the background. A set of strokes thus defined are used in subsequent steps for defining an image area rectangle surrounding each image area.

Figure 10:
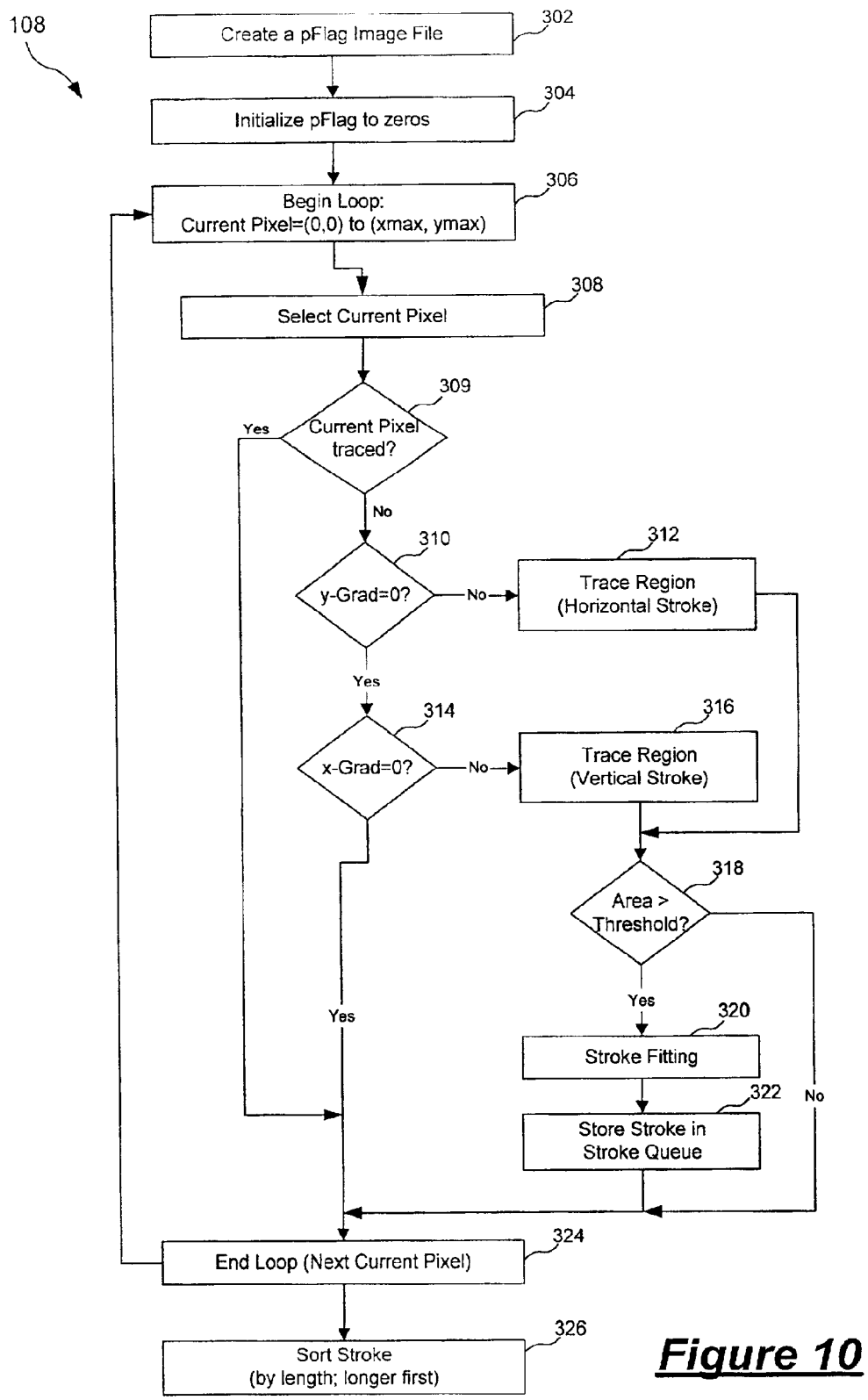
FIG. 10 is a flowchart illustrating the stroke detection process of the image area detection method according to one embodiment of the present invention.

FIG. 10 is a flowchart illustrating the stroke detection process of the image area detection method according to one embodiment of the present invention. Referring to FIG. 10, at step 302, an 1-bit image file in bitmap format, called pFlag image file, is created. pFlag image file is the same size as resized image 132. pFlag image file is used to store a flag, referred herein as pFlag, for identifying whether a particular pixel in resized image 132 has been traced. The tracing operation will be explained in more detail below. In the present embodiment, pFlag has a value of "1" if the pixel has been traced and a value of "0" if the pixel has not yet been traced. At step 304, the pFlag image file is initialized to zero, indicating that all the pixels have not been traced.

At step 306, stroke detection process 108 begins a loop from the bottom-left pixel, having coordinate (0, 0) in bitmap format, to the top-right pixel, having coordinate (xmax, ymax) which is (281, 389) in the present embodiment. At step 308, the current pixel is selected.

At step 309, process 108 determines whether the current pixel has already been traced by accessing the corresponding pFlag in the pFlag image file. If the current pixel has been traced, then the subsequent steps are skipped and process 108 proceeds to select the next pixel as current pixel (step 324). If the current pixel has not been traced, process 108 proceeds to step 310 where the y-Grad value for the current pixel is retrieved and determined if the y-Grad value is non-zero. In stroke detection process 108, only pixel locations with non-zero gradient values are of interest for stroke formation because these are the pixel locations of potential boundaries. A zero gradient value (shown as black areas in FIGS. 9a and 9b) represents an non-edge pixel location and thus has no relevancy in the stroke formation process. If the current pixel has a zero y-gradient value, process 108 proceeds to determine if the current pixel has a non-zero x-Grad value (step 314). If both the x-Grad and the y-Grad values are zero, the current pixel is an non-edge pixel and process 108 proceeds to the next pixel (step 324).

Recall that in the gradient calculation process, a non-zero gradient pixel either has an x-gradient value or a y-gradient value but not both. So when the current pixel has a non-zero gradient value, process 108 will either continue at step 312 to trace a region defining a horizontal stroke (non-zero y-gradient) or continue at step 316 to trace a region defining a vertical stroke (non-zero x-gradient). As a result of steps 310 and 314, only pixels with non-zero gradient values in FIGS. 9a and 9b are subjected to tracing. FIG. 15 is an image of the pFlag image file illustrating the pixel locations which have been traced in stroke detection process 108. As shown in FIG. 15, only the vertical and horizontal edges in FIGS. 9a and 9b are traced.

Figure 11:
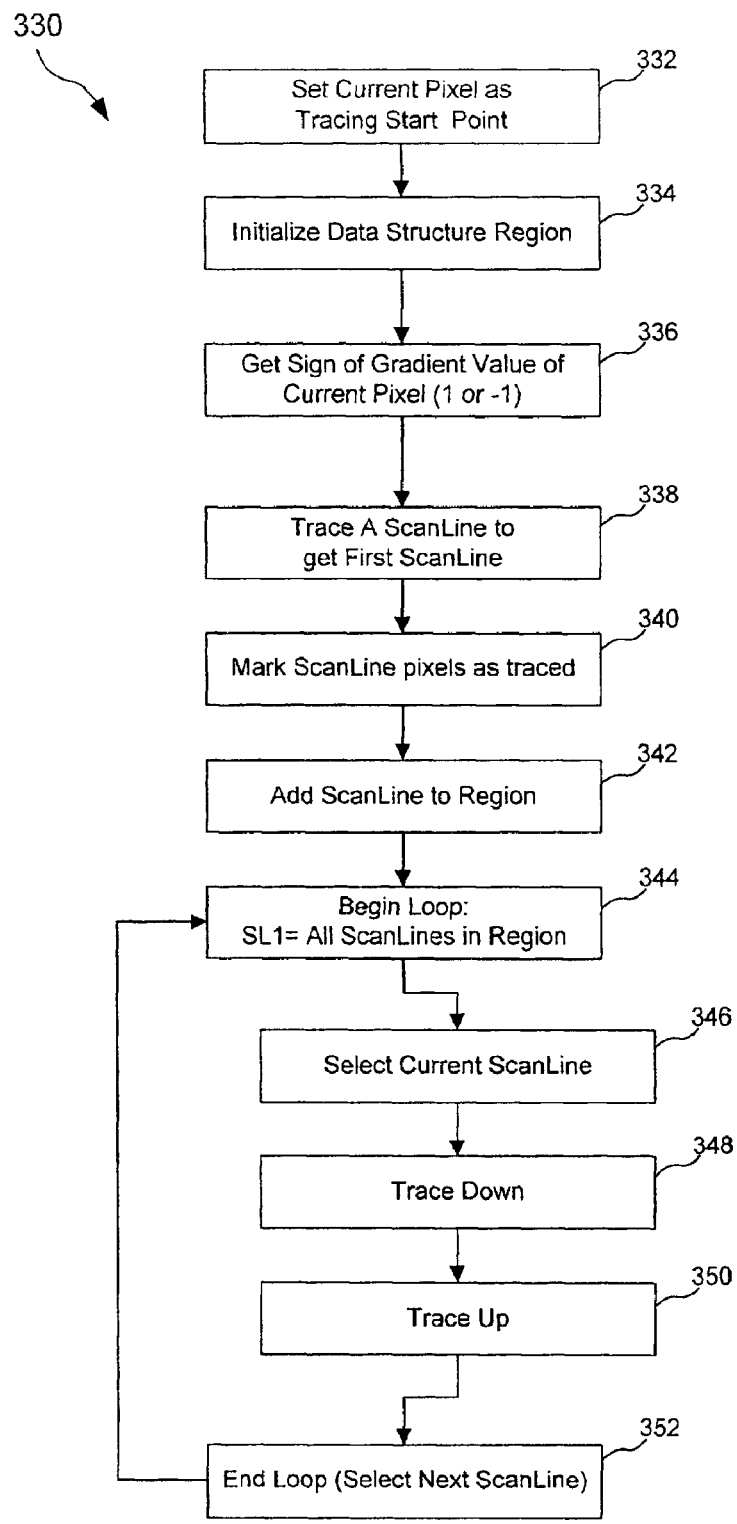
FIG. 11 is a flowchart illustrating the Trace Region process according to one embodiment of the present invention.

Steps 312 and 316 use the same Trace Region process 330 illustrated by the flowchart in FIG. 11. The operation of Trace Region process 330 will be described in more detail below. For the purpose of the present description, it is sufficed to state that the Trace Region process generates as output definition of a cluster of pixels, also referred to as a "region" of pixels, having the same gradient direction The cluster of pixels is indicative of a potential stroke and is typically in the shape of a line segment.

After the Trace Region process (step 312 or 316), the area of the region of pixels is computed and compared with an area threshold value (step 318). The area threshold value is applied to eliminate fractional regions that are too small to constitute a meaningful stroke. In the present embodiment, an area threshold of 16 pixels is used. If the region of pixels is not greater than the area threshold, process 108 proceeds to the next pixel (step 324).

If the region of pixels identified by the Trace Region process is large enough, then a Stroke Fitting process 320 is performed to fit a line through the region of pixels. The Stroke Fitting process 320 is illustrated in the flow chart in FIG. 14 and will be described in more detail below. The Stroke Fitting process 320 generates the definition for a stroke including pixel coordinates of the start and end points. The stroke definition is stored in a stroke queue (step 322). Process 108 then proceeds to repeat steps 308 to 322 on the next pixel (step 324).

After the completion of the loop (steps 306 to 324), process 108 has operated on all of the pixels in resized image 132 and has formed a list of strokes delimiting boundaries of image areas and background area. FIG. 16 is an image illustrating the multiple strokes detected and defined by stroke detection process 108. Note that even though the strokes appear to be connected in FIG. 16, this is merely an artifact of the illustrated image. The strokes in FIG. 16 may not be connected to each other. For example, at the top right corner, two strokes (stroke 1 and stroke 2) are defined and are disjointed from each other. FIG. 16 merely illustrates that strokes indicative of boundaries in resized image 132 have been successfully defined.

Returning to FIG. 10, a step 326 is performed to sort the list of strokes. In the present embodiment, the strokes are sorted by length so that the longest stroke is listed before the shorter strokes. As will become apparent in the description below, the sorting step is performed to enhance the efficiency of a subsequent depth-first searching step because the longer strokes are more likely candidates for forming correct image area rectangles.

Attention will now turn to the Trace Region process and the stroke fitting process used in stroke detection process 108.

Stroke Detection—Trace Region

FIG. 11 is a flowchart illustrating the Trace Region process according to one embodiment of the present invention. Trace Region process 330 operates on a current pixel which has been identified as having a non-zero gradient value either in the horizontal or the vertical direction. In the follow description, the gradient values refer to the gradient values in a direction in which the current pixel has a non-zero value. For example, when the current pixel has a non-zero gradient value in the horizontal direction (x-gradient), then all gradient values referred to in the Trace Region process are gradient values in the horizontal direction.

At step 332, the current pixel is set as the starting point of the tracing operation. At step 334, a data structure "Region" is initialized. Data Structure Region will be used to store the pixel locations which are to be grouped in one cluster by the Trace Region process 330.

At step 336, the sign of the gradient value of the current pixel is retrieved. The sign is either positive (denoted as "1" in the present embodiment) or negative (denoted as "−1" in the present embodiment). Then Trace Region process 330 proceeds to trace a scan line for defining the first scanline of the Region (step 338). Step 338 uses a Trace a ScanLine process 360 illustrated in FIG. 12. In the present description, a scanline is defined as a line in a row of pixels having a starting coordinate x1 and an end coordinate x2. In the present embodiment, a Region is defined by one or more scanlines. Thus, the cluster of pixels forming a Region is defined by a one or more of adjacent scanlines of various length.

Figure 12:
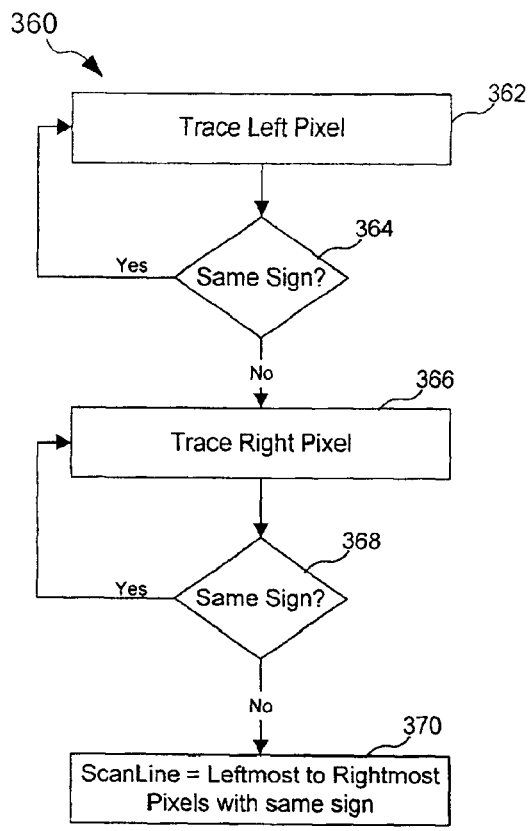
FIG. 12 is a flowchart illustrating the Trace a ScanLine process according to one embodiment of the present invention.

Referring to FIG. 12 which is a flowchart illustrating Trace a ScanLine process 360 according to one embodiment of the present invention, process 360 starts by tracing the pixel to the left of the current pixel (step 362). The sign of the gradient value for the left pixel is retrieved and compared with the sign of the current pixel (step 364). Note that the left pixel can have a sign of +1, −1 or 0 (if the gradient value is zero). If the left pixel has the same sign as the current pixel, process 360 repeats step 362 to trace another pixel to the left of the previously traced pixel. The tracing process continues so as to capture all of the pixels to the left of the current pixel that have the same gradient sign as the current pixel. When the tracing process encounters a pixel to the left that does not have the same sign, process 360 proceeds to trace pixels to the right of the current pixel (step 366). The sign of the gradient value of the pixel to the right of the current pixel is retrieved and compared with the sign of the current pixel (step 368). If the sign is the same, the tracing process continues to the right until a pixel with a different sign is encountered. As a result, a scanline consisting of the leftmost to the rightmost pixels with the same sign as the current pixel is defined (step 370).

Returning to FIG. 11, Trace a ScanLine process 360 is used to trace the first scanline for the current pixel (step 338). The pixel locations on the scanline are marked as traced by setting the corresponding pFlag in the pFlag image files as described above (step 340). The scanline is then added to the Region (step 342). Having defined the first scanline on which the current pixel lies, Trace Region process 330 begins a loop operation (steps 344 to 352) for tracing rows above and below the first scanline so that a cluster of pixels having the same gradient sign can be grouped into the same Region. In fact, the loop operation (steps 344 to 352) in process 330 is an iterative process where each time a new scanline is traced and added to the Region, that new scanline will be subjected to the loop operation so as to trace even more rows above and below the new scanline to determine if additional rows should be included in the cluster of pixels.

Referring to FIG. 11, step 344 begins a loop for all scanlines defined in the Region. At step 346, a current scanline is selected. Then, a Trace Down step 348 is carried out followed by a Trace Up step 350. Trace Down step 348 and Trace Up step 350 can both potentially define and add more scanlines in the Region. If so, the loop operation will continue with the next scanline (step 352) until all of the scanlines have been traced up and down once.

Figure 13:
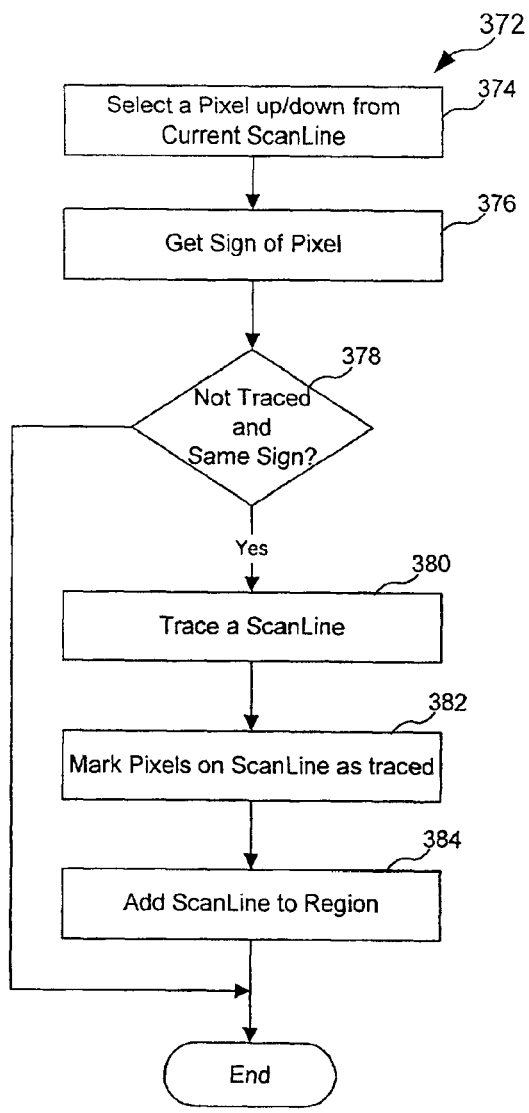
FIG. 13 is a flowchart illustrating the Trace Up/Down process according to one embodiment of the present invention.

Trace Down step 348 and Trace Up step 350 both use a Trace Up/Down process 372 illustrated in the flowchart of FIG. 13. Referring to FIG. 13, at step 374, Trace Up/Down process 372 starts by selecting a pixel either one row up or down from the start coordinate x1 of the current scan line. The sign of the gradient value of that pixel is retrieved (step 376). Process 372 then determines whether the pixel has been traced by checking the pFlag and whether the pixel has the same sign as the current pixel (step 378). Note that the sign of the current pixel is determined in step 336 of Trace Region process 330 (FIG. 11). If the pixel has either been traced already or does not have the same gradient sign, Trace Up/Down process 372 terminates. On the other hand, if the pixel has not been traced and has the same sign as the current pixel, Trace Up/Down process 372 proceeds to trace a scan line (step 380) using Trace a ScanLine process 360 of FIG. 12. After a scanline is defined, the pixels associated with the scanline are marked as traced by setting the corresponding pFlag in the pFlag image file (step 382). The new scanline is then added to the Region (step 384).

In summary, Trace Region process 330 operates to define a cluster of pixels having the same gradient sign. The cluster of pixels forms a Region which is subsequently used by Stroke Fitting process 320 for forming a stroke defined by the cluster of pixels.

Stroke Detection—Stroke Fitting

Figure 14:
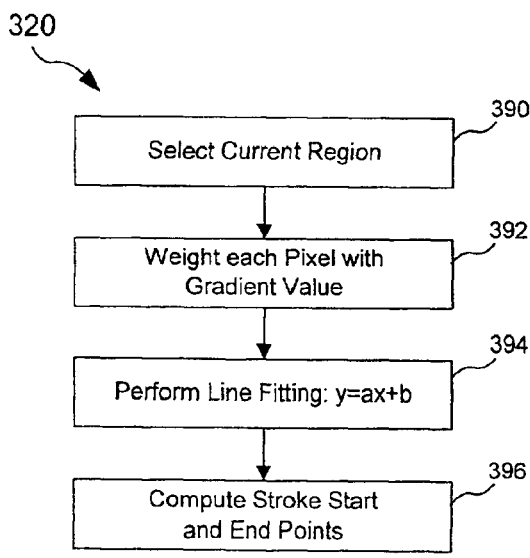
FIG. 14 is a flowchart illustrating the Stroke Fitting process according to one embodiment of the present invention.

FIG. 14 is a flowchart illustrating the Stroke Fitting process according to one embodiment of the present invention. The basic operation of Stroke Fitting process 320 is to fit a line segment to the cluster of pixels (the Region) defined in the Trace Region step (step 312 or 316) of stroke detection process 108. Stroke Fitting process 320 starts by selecting a current region to be fitted (step 390).

Any techniques for fitting a set of data points to a straight line, referred to as linear regression, can be used in the Stroke Fitting process of the present invention. In the present embodiment, a least mean square linear regression algorithm is used to fit the cluster of pixels to a stroke. Line fitting algorithms are generally described in "Numerical Recipes in C: The Art of Scientific Computing," by Numeric Recipes Software, Cambridge University Press, 1992.

Furthermore, in accordance with the present embodiment, to improve the accuracy of the linear regression, the data points (the pixel locations) are weighted by the gradient values. Specifically, the gradient value (the weight) plays a role in defining the uncertainty measurement, $\sigma_i$, for ensuring that a good fit can be derived. Since a large gradient value is a strong indication of an edge, weighing the pixel locations with the corresponding gradient values can assure that pixel locations with large gradient values will contribute more to the line fitting computation while pixel locations with small gradient values will contribute less to the line fitting computation.

Thus, at step 392, each pixel value in the cluster of pixels is weighted with its associated gradient value. Then, a line fitting process is performed to fit the cluster of pixels to a line (step 394).

Having fitted a line through the Region, the start point and the end point of the stroke can be computed (step 396). The start and end points of the stroke is defined based on the sign of the gradient value defining the current pixel. Note that the start point of a stroke is defined so that, when viewing from the start point to the end point, all the pixels on the left are dark colors. Thus, if a current pixel has a negative horizontal gradient value, the stroke would be a vertical stroke pointing downward since the dark region should be on the left of the start point.

In this manner, Stroke Fitting process 320 defines a stroke having a start point and an end point.

Stroke Merge

Referring again to FIG. 16 illustrating the set of strokes defined for resized image 132, stroke detection process 108 may yield strokes that are disjointed due to the content of the image areas. Thus, after the set of strokes is defined, a stroke merge process 110 (FIG. 3) is performed to attempt to merge as many of the strokes as possible using a set of constraints. Specifically, if two strokes are collinear and have start/end points which are sufficiently close, the two strokes are merged as one stroke.

Figure 17A:
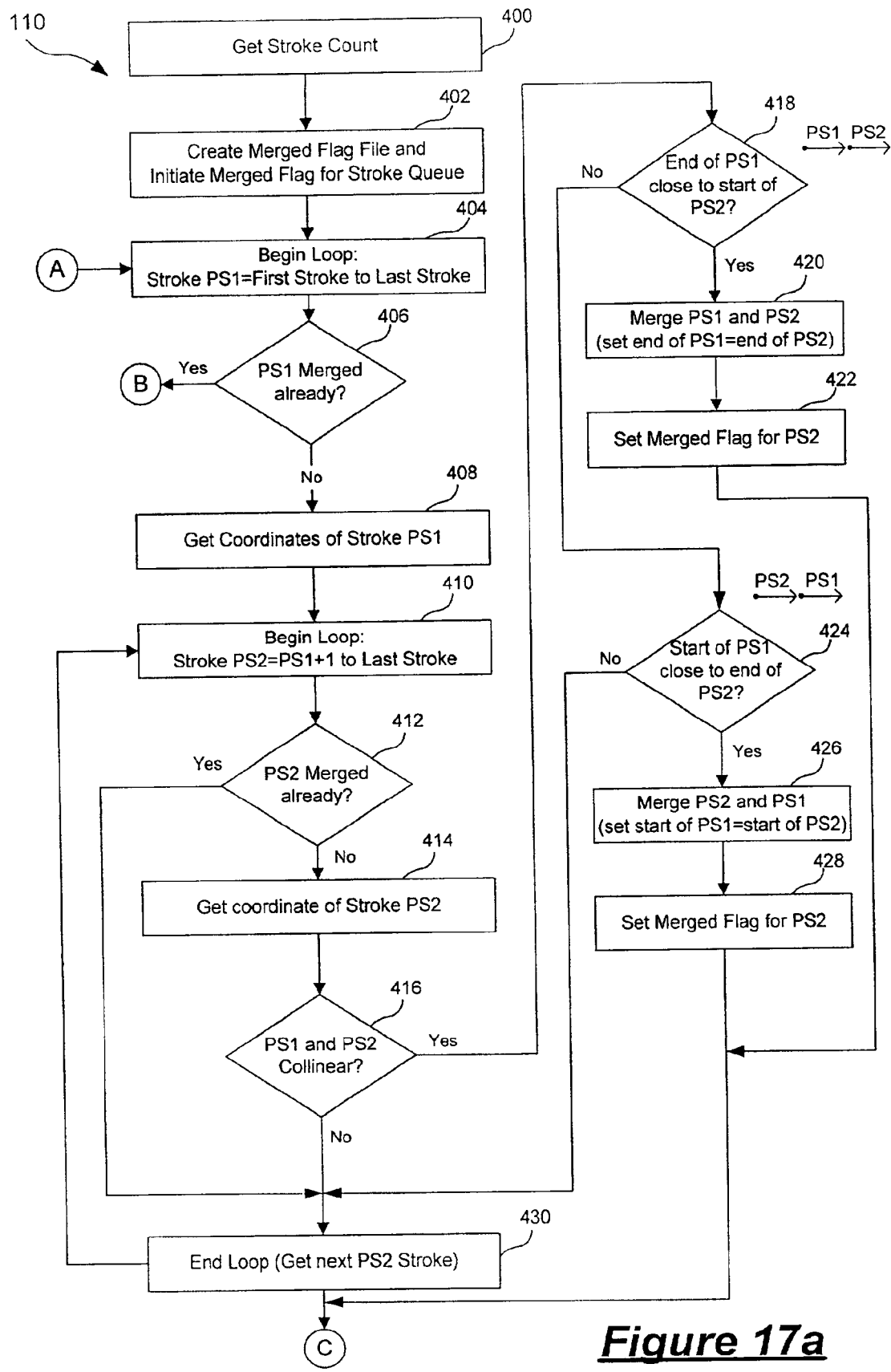
FIGS. 17a and 17b are flowcharts illustrating the stroke merge process of the image area detection method according to one embodiment of the present invention.
Figure 17B:
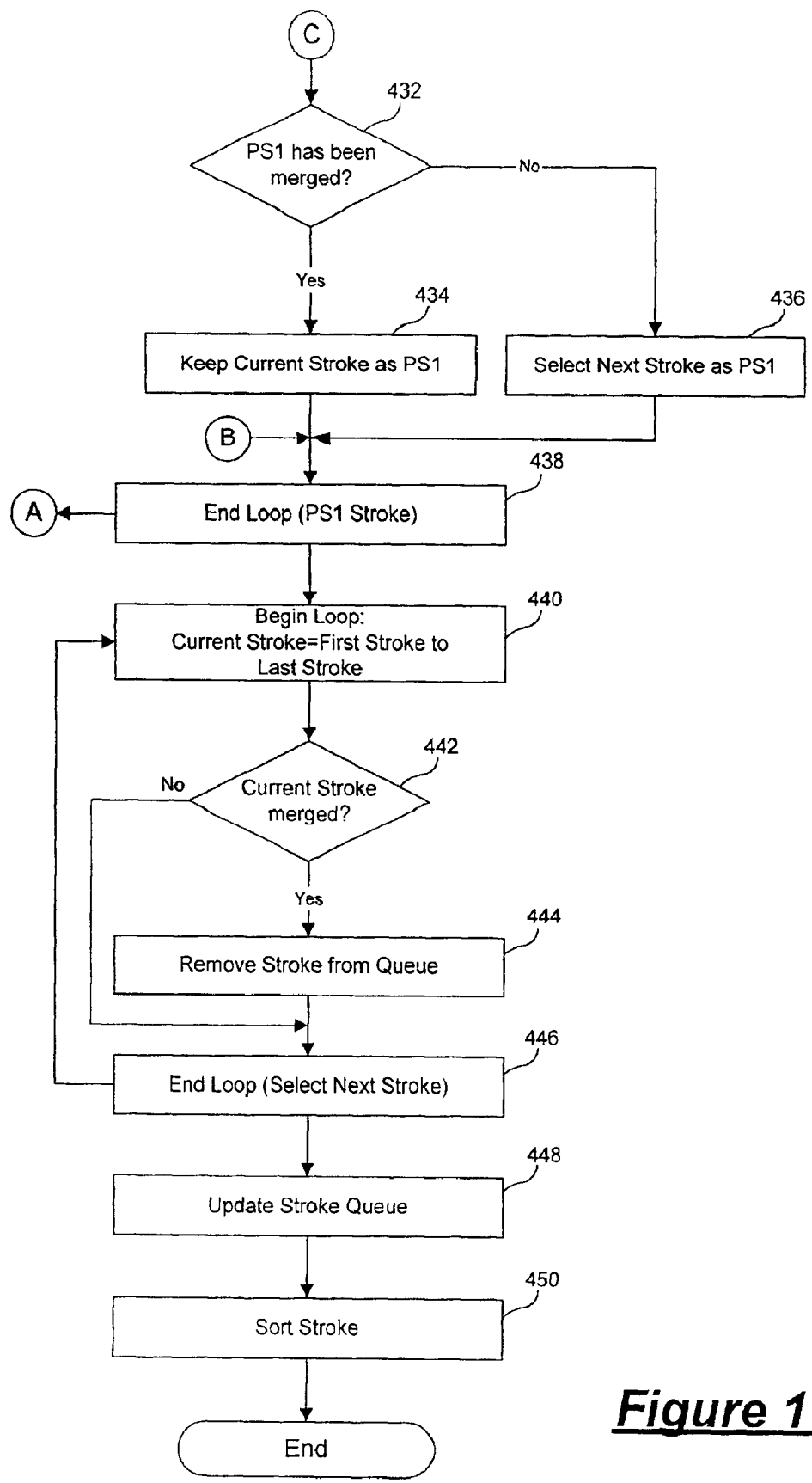

FIGS. 17a and 17b are flowcharts illustrating the stroke merge process of the image area detection method according to one embodiment of the present invention. Referring to FIG. 17a, at step 400, the count of strokes is obtained. Then, at step 402, a merged flag file for the stroke queue is created and the merged flag is initialized. The merged flag is used to indicate whether a stroke in the stroke queue has been merged.

At step 404, stroke merge process 110 begins a loop on a stroke PS1 which steps from the first stroke to the last stroke. At step 406, stroke merge process 110 determines if stroke PS1 has been merged already by checking the merged flag. If stroke PS1 has been merged, process 110 continues to select the next stroke as stroke PS1 (step 438 in FIG. 17b). If stroke PS1 has not been merged, the coordinates of stroke PS1 are retrieved (step 408).

Then, stroke merge process 110 begins a second loop on a stroke PS2 which steps from the stroke after the current PS1 stroke to the last stroke (step 410). That is, for every stroke PS1, stroke PS2 steps through all other strokes following stroke PS1. Stroke PS2 is checked to determine if it has been merged (step 412). If stroke PS2 has been merged, process 110 continues by selecting the next stroke PS2 (step 430). If stroke PS2 has not been merged already, then stroke merge process 110 proceeds to determine if stroke PS2 can be merged with stroke PS1.

Figure 18:
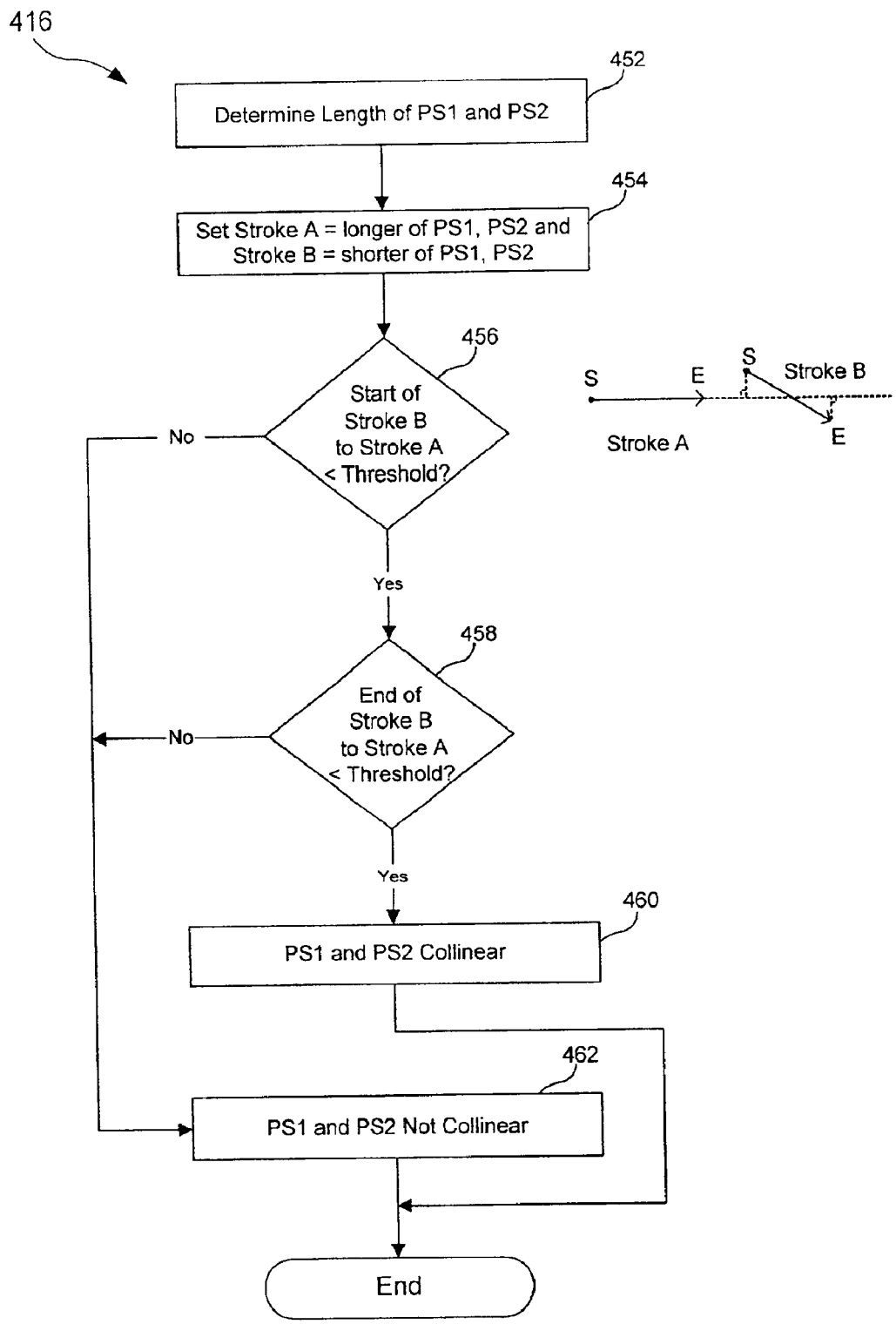
FIG. 18 is a flowchart illustrating the collinearity determination step according to one embodiment of the present invention.

At step 416, stroke merge process 110 determines if strokes PS1 and PS2 are collinear. The process for determining collinearity is illustrated in FIG. 18 and will be described in more detail below. Basically, step 416 determines if stroke PS1 and stroke PS2 lie approximately on the same straight line. If stroke PS1 and stroke PS2 are not collinear, then process 100 selects the next stroke PS2 (step 430).

If stroke PS1 and stroke PS2 are determined to be collinear, stroke merge process 110 proceeds to determine if the start/end points of the two strokes are sufficiently close (steps 418–428). If stroke PS1 and stroke PS2 are collinear, there are two possible configurations for the two strokes: either PS1 is before PS2 or PS1 is after PS2. These two configurations are tested by steps 418 and 424, respectively. The two stroke configurations are shown by the pictorial inserts adjacent steps 418 and 424.

Referring to step 418, process 110 determines if the end point of PS1 is close to the start point of PS2. In the present embodiment, the closeness is measured by the distance between PS1 end point and PS2 start point. The distance has to be smaller than a predefined threshold. In one embodiment, a threshold of 4 pixels is used. Thus, the end point of PS1 is close to the start point of PS2 if these two points are separated by less than or equal to 4 pixels. If the end point of PS1 is close to the start point of PS2, then the two strokes are merged (step 420). The merging operation is carried out by setting the end point of stroke PS1 to be the end point of PS2. The merged flag for stroke PS2 is set (step 422) so that stroke PS2 can be taken out of the stroke merge process. Process 110 then proceeds to step 432 (FIG. 17b).

Step 418 tests the first PS1/PS2 configuration. If strokes PS1, PS2 fail the first configuration, process 110 continues by testing the second PS1/PS2 configuration. Thus, at step 424, process 110 determines if the start point of PS1 is close to the end point of PS2. The same threshold applied above in step 418 can be applied here. Thus, the start point of PS1 is close to the end point of PS2 if the two points are separated by less than or equal to 4 pixels. If the two strokes are close, then PS1 and PS2 are merged (step 426). In this case, the merging is carried out by setting the start point of PS1 to be the start point of PS2. The merged flag for stroke PS2 is set at step 428. The process continues at step 432 (FIG. 17b).

If stroke PS1 and stroke PS2 are not sufficiently close (step 424), process 110 continues by selecting the next stroke as stroke PS2 (step 430).

Referring now to FIG. 17b, after the loop on stroke PS2 has stepped through all the relevant strokes, process 110 continues by determining if any merging has been carried out on stroke PS1 (step 432). If stroke PS1 has been merged, then process 110 retains stroke PS1 as the current PS1 stroke (step 434) and repeats steps 410 to 430 to determine if the newly merged stroke PS1 can be merged with yet another stroke. If after the operation of the PS2 loop, no merging has been carried out on stroke PS1, then the loop on stroke PS1 advances to the next stroke in the stroke queue (step 436). Steps 404 to 438 are repeated to determine if the new stroke PS1 can be merged with another stroke in the stroke queue.

At the conclusion of step 438, all the strokes have been processed and, if possible, merged. Stroke merge process 110 then proceeds with optional data structure administration steps. In the preset embodiment, a loop including steps 440 to 446 is used to step through the strokes in the stroke queue and remove any stroke which has been merged into another stroke (step 444). The stroke queue can then be updated (step 448) to include only strokes which have merged with other strokes and strokes which cannot be merged with any other strokes. Once again, the strokes are sorted in order by length (step 450) with the longest stroke listed first.

Figure 19:
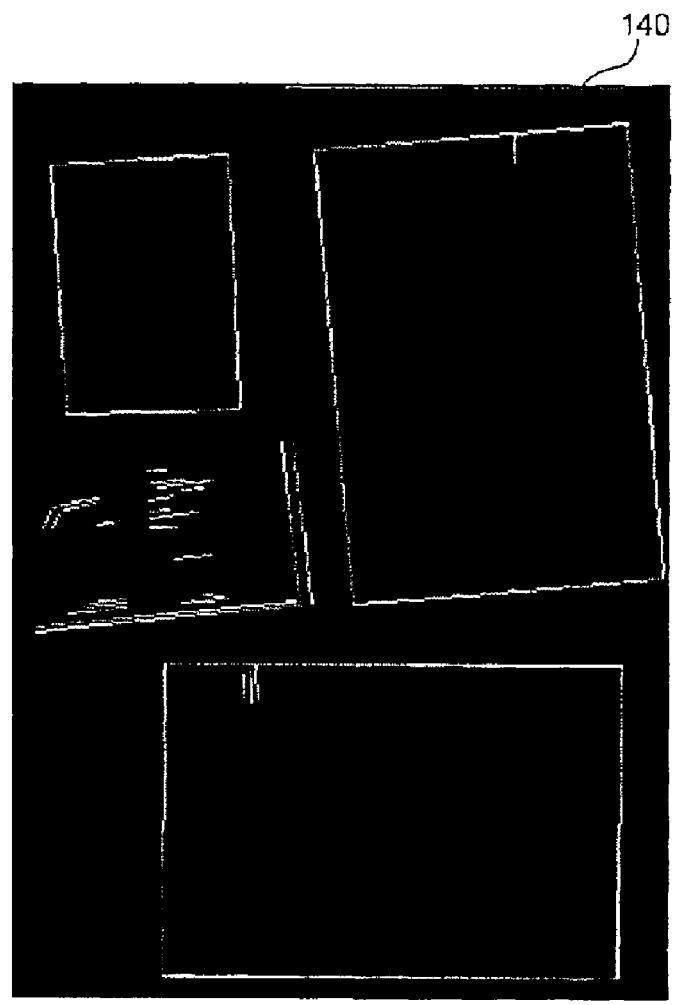
FIG. 19 is an image illustrating the set of strokes in FIG. 16 after the stroke merge process.

FIG. 19 is an image illustrating the set of strokes in FIG. 16 after the stroke merge process. FIG. 19 illustrates the updated list of strokes 140. The stroke merge process is able to define longer strokes spanning substantially the entire length of each boundary in the resized image.

Discussion is now turned to the collinearity determination step 416 in FIG. 17a. FIG. 18 is a flowchart illustrating the collinearity determination step according to one embodiment of the present invention. Referring to FIG. 18, at step 452, the length of each of stroke PS1 and stroke PS2 is determined. At step 454, stroke A is set to be the longer of stroke PS1 and stroke PS2 while stroke B is set to be the shorter of the two. Collinearity is then measured by extending the line segment of stroke A, the longer stroke, and computing the vertical distance from the start/end points of stroke B to the line segment representing stroke A. The computation is illustrated in the pictorial insert adjacent step 456 in FIG. 18.

Collinearity exists if the vertical distance from both the start point and the end point of stroke B to stroke A is less than or equal to a threshold (steps 456 and 458). In the present embodiment, a threshold of 1.5 to 2 pixels is used. If conditions in steps 456 and 458 are met, collinearity determination step 416 returns a value indicating that stroke PS1 and PS2 are collinear (step 460). Otherwise, collinearity determination step 416 returns a value indicating that stroke PS1 and PS2 are not collinear (step 462).

In this manner, collinearity of two strokes are determined to indicate whether the two strokes are candidate for merging.

Corner Detection

Returning to FIG. 3, method 100 has now defined a set of strokes and have refined the stroke definition by merging as many of the strokes as possible. Method 100 proceeds with a corner detection process 112 where a list of corners are defined. In the present description, corners are potential vertexes of the image area rectangle to be defined in method 100.

Figure 22:
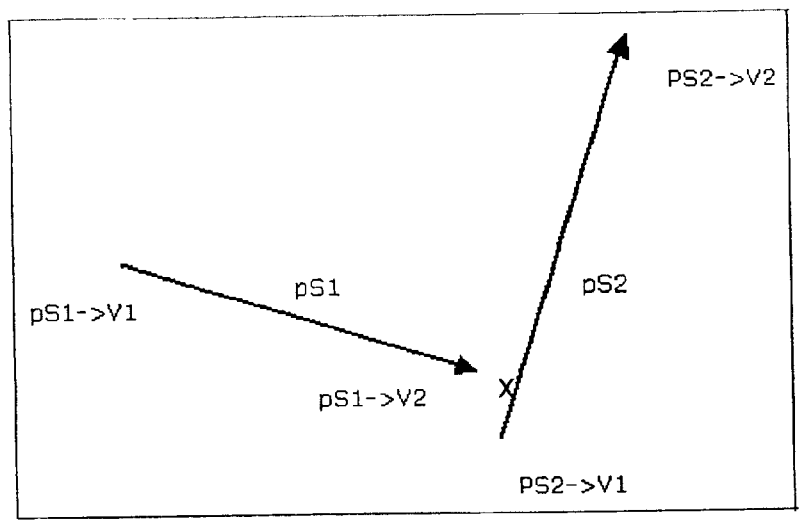
FIG. 22 illustrates two strokes PS1 and PS2 which are candidates for forming a corner.

In the present embodiment, a corner is defined as a pixel location where two strokes are perpendicular to each other, are oriented in a counter-clockwise manner and where a start point of one is sufficiently close to an end point of the other. FIG. 22 illustrates two strokes PS1 and PS2 which are candidates for forming a corner. If strokes PS1 and PS2 meet the constraints stated above, an intersection of the two strokes is computed as a candidate corner. Because not all stroke intersections are reasonable corners, the corner detection process calculates a corner likelihood value for each intersection to determine if the stroke intersection should be considered as a real corner.

The counter-clockwise orientation constraint is related to the definition of a stroke used in the present embodiment. Recall that a stroke is defined so that when viewed from its start point to the end point, the left side is a potential image area and the right side is potential background area. Therefore, when a group of strokes forms an image area rectangle and encloses an image area, the strokes will line up in a counter-clockwise manner. For example, when a stroke A is in a vertical direction pointing upward, the left side of stroke A is a potential image area while the right side of stroke A is a potential background area. Thus, another stroke B which can be grouped with stroke A to form a rectangle should have its end point close to the start point of stroke A, or stroke B should have its start point close to the end point of stroke A. In either case, the orientation of the two strokes are in a counter-clockwise manner.

Figure 20:
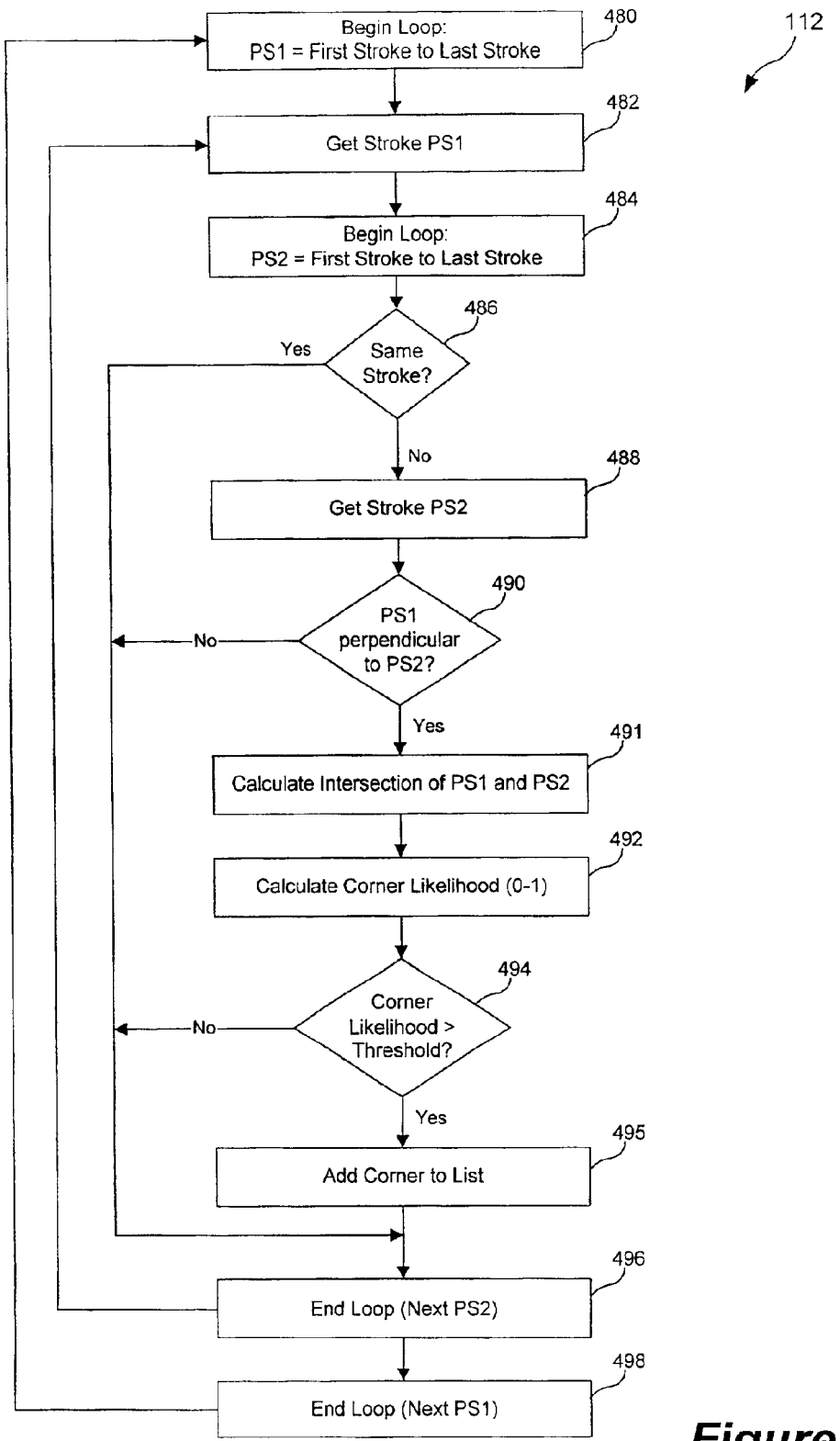
FIG. 20 is a flowchart illustrating the corner detection process of the image area detection method according to one embodiment of the present invention.

FIG. 20 is a flowchart illustrating the corner detection process of the image area detection method according to one embodiment of the present invention. Referring to FIG. 20, corner detection process 112 begins with a first loop on a stroke PS1 stepping through all the strokes in the updated stroke queue (step 480). A stroke in the updated stroke queue is retrieved as stroke PS1 (step 482). Then, a second loop is established on a stroke PS2 stepping through all the strokes in the updated stroke queue (step 484). Process 112 first determines if stroke PS2 is the same stroke as stroke PS1 (step 486). If so, process 112 skips to select another stroke for stroke PS2 (step 496). If strokes PS1 and PS2 are not the same, stroke PS2 is retrieved from the updated stroke queue (step 488).

At step 490, stroke PS1 and stroke PS2 are tested to determine if the two strokes meet the perpendicular constraint. In the present embodiment, perpendicularity is determined by computing the angle between strokes PS1 and PS2 and then computing the cosine of the angle. The absolute value of the cosine of the angle between strokes PS1 and PS2 is compared with an angle threshold value to determine if the two strokes are perpendicular. The threshold value can be selected to be zero or near zero since cosine of a 90° angle is zero. In the present embodiment, a threshold value of 0.05 used. If the absolute value of the cosine of the angle be strokes PS1 and PS2 is less than the angle threshold, the two strokes are deemed perpendicular. Otherwise, the two strokes are not perpendicular and thus are not candidate for corner formation. Process 112 continues with selecting the next PS2 stroke for corner detection (step 496).

If stroke PS1 and stroke PS2 meet the perpendicular constraint, an intersection of the two strokes is calculated (step 491). The coordinate of the pixel location of the intersection is derived. Then, process 112 continues by calculating the corner likelihood of the current intersection (step 492). The corner likelihood calculation process is illustrated in the flowcharts in FIGS. 21a and 21b. Details of the corner likelihood calculation process will be described below. In brief, the corner likelihood calculation process determines whether strokes PS1 and PS2 are in the correct orientation (counter-clockwise). If the two strokes are in the correct orientation, a corner likelihood value is computed based on the distance between the start/end points of the two strokes. In the present embodiment, the corner likelihood value is a value between 0 and 1.

At step 494, process 112 determines if the corner likelihood value computed for strokes PS1 and PS2 is greater than a predefined threshold value. In the present embodiment, the threshold value is 0.75. Thus, an intersection with a corner likelihood of less than 0.75 is not considered a good candidate for a corner and the intersection is discarded. Process 112 then continues with the next PS2 stroke (step 496). If the corner likelihood value computed for strokes PS1 and PS2 is equal to or greater than the threshold value, the intersection computed in step 491 is considered to be a valid corner and the intersection is added to the list of corners (step 495). In the present embodiment, the threshold value is selected to be a value not very close to the maximum likelihood value. This is because image content and noise may cause two strokes to be separated even when their intersection represents a corner. Therefore, the threshold value is selected to be more forgiving to include corners formed by strokes which meet the perpendicular and orientation constraints but are not very close to each other.

Process 112 continues by stepping through all the PS2 strokes (step 496). Then, process 112 selects the next PS1 stroke (step 498) and repeats steps 482 to 496 for the next PS1 stroke until all of the strokes in the updated stroke queue have been processed.

Referring to FIG. 22, two strokes, PS1 and PS2, meeting the constraints for a corner formation are shown. First, PS1 and PS2 are perpendicular to each other. Second, PS1 and PS2 are arranged in a counter-clockwise orientation. Third, the end point of PS1 is sufficiently close to the start point of PS2. Therefore, an intersection, marked by an "X" in FIG. 22, of stroke PS1 and stroke PS2 is stored as a corner in the list of corners.

Figure 23:
FIG. 23 is an image depicting the result of the corner detection step operating on the merged strokes of FIG. 19.

FIG. 23 is an image depicting the result of the corner detection step operating on the merged strokes of FIG. 19. In FIG. 23, a number of corners are defined. These corners are strong evidence of the vertexes of image areas in the resized image.

Discussion is now turned to the corner likelihood calculation process (step 492 of FIG. 20).

Corner Detection—Corner Likelihood Calculation

Figure 21A:
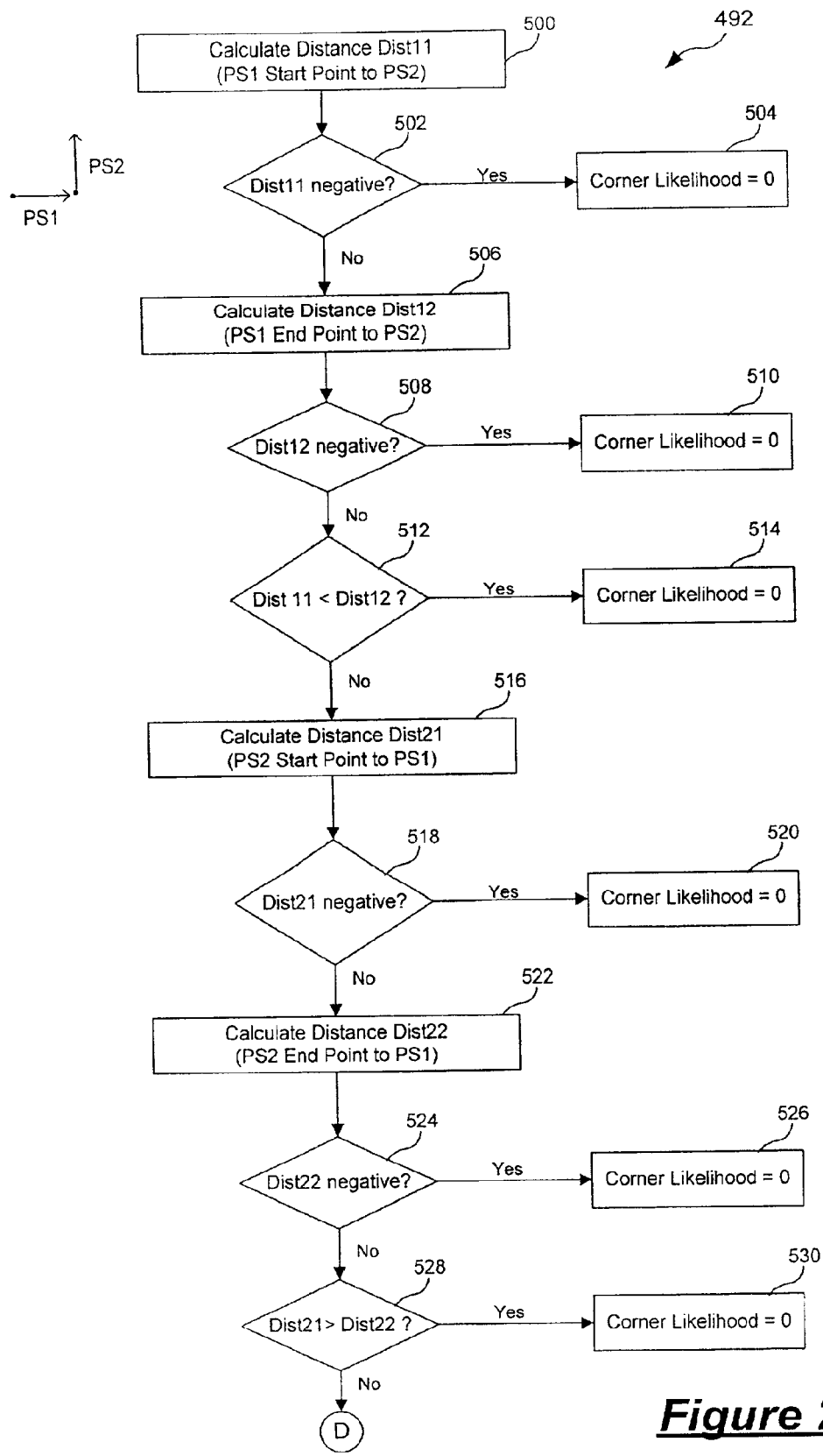
FIGS. 21a and 21b are flowcharts illustrating the corner likelihood calculation process according to one embodiment of the present invention.
Figure 21B:
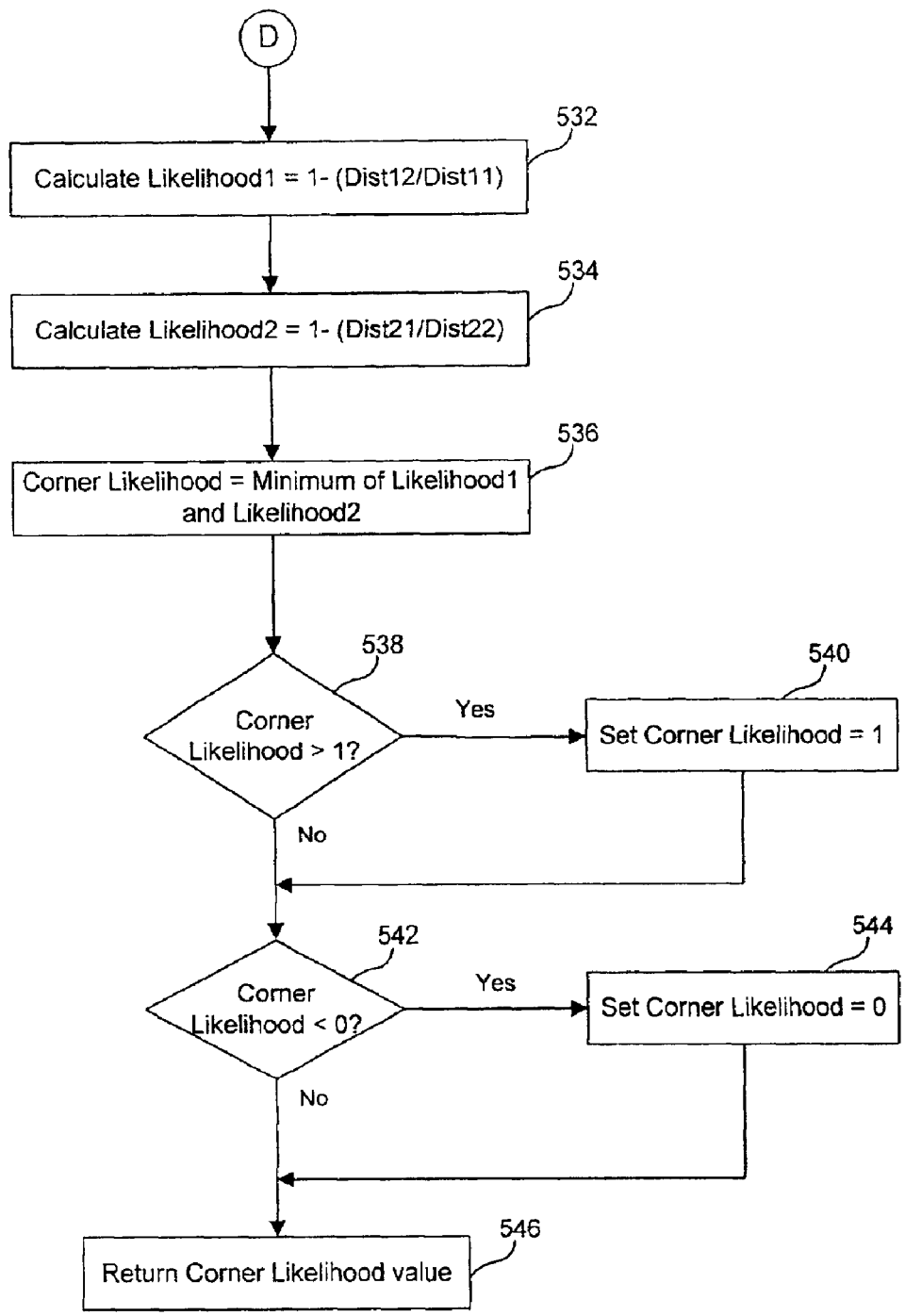

FIGS. 21a and 21b are flowcharts illustrating the corner likelihood calculation process according to one embodiment of the present invention. Corner likelihood calculation process 492 receives as input stroke PS1 and stroke PS2 which have been determined to be perpendicular. An intersection of the two strokes has also been computed. In accordance with the present embodiment, the corner detection process assumes that when two strokes are in the correct orientation (counter-clockwise manner), the two strokes are configured as shown in the pictorial insert in FIG. 21a adjacent step 502. That is, it is assumed that stroke PS1 is following by stroke PS2 at the potential corner where the corner is formed near the end point of PS1 and the start point of PS2.

Corner likelihood calculation process starts by testing whether strokes PS1 and PS2 are in the correct orientation using the stroke configuration given above. If the strokes are correctly oriented (i.e., in a counter-clockwise manner), a corner likelihood value based on the closeness of the start/end points of the two strokes is computed. Referring to FIG. 21a, steps 500 to 530 are used to test the stroke configuration. Finally, referring to FIG. 21b, steps 532 to 546 are used to compute the corner likelihood value.

Referring to FIG. 21a, at step 500, process 492 calculates a distance Dist11 which is the vertical distance from the start point of stroke PS1 to stroke PS2. In the present embodiment, when a stroke is viewed from the start point to the end point, vertical distances on the left side of the stroke is given a positive value while vertical distances on the right side of the stroke is given a negative value. Thus, if strokes PS1 and PS2 are in the correct orientation as shown in the insert, distance Dist11 should be a positive value. If Dist11 is a negative value (step 502), then stroke PS1 is located on the right side of stroke PS2 which does not result in a correct orientation. Thus, the corner likelihood value is set to zero (step 504).

At step 506, process 492 calculates a distance Dist12 which is the vertical distance from the end point of stroke PS1 to stroke PS2. Again, if distance Dist12 is a negative value (step 508), strokes PS1 and PS2 are not in the correction orientation and the corner likelihood value is set to zero (step 510).

At step 512, distance Dist11 is compared with distance Dist12. If stroke PS1 and stroke PS2 are oriented in the correct sequence, distance Dist11 should be greater than Dist12. Thus, if Dist11 is less than Dist12, the strokes are not in the correct sequence and the corner likelihood value is set to zero (step 514).

At step 516, process 492 calculates a distance Dist21 which is the vertical distance from the start point of stroke PS2 to stroke PS1. If strokes PS1 and PS2 are in the correct orientation, then distance Dist21 should be a positive value. If Dist21 is a negative value (step 518), then stroke PS2 is located on the right side of stroke PS1 which does not result in a correct orientation. Thus, the corner likelihood value is set to zero (step 520).

At step 522, process 492 calculates a distance Dist22 which is the vertical distance from the end point of stroke PS2 to stroke PS1. Again, if distance Dist22 is a negative value (step 524), then strokes PS1 and PS2 are not in the correction orientation and the corner likelihood value is set to zero (step 526).

At step 528, distance Dist21 is compared with distance Dist22. If stroke PS1 and stroke PS2 are oriented in the correct sequence, the distance Dist21 should be less than Dist22. Thus, if Dist21 is greater than Dist22, the strokes are not in the correct sequence and the corner likelihood value is set to zero (step 530).

In accordance with the present invention, in determining whether Dist11, Dist12, Dist21 and Dist22 (steps 502, 508, 518 and 524) are each a negative value, the distance values are compared with a small negative threshold value. The use of a small negative threshold value instead of zero in these determination step ensures that only strokes which are not aligned in the correct orientation are discarded for corner formation purpose. Often, noise or image content in the resize image may cause an end point of one stroke to slightly exceed the start point of another stroke, resulting in a negative distance value, even though the two strokes are true corners of an image area.

Turning now to FIG. 21b for the calculation of the corner likelihood value when strokes PS1 and PS2 are found to be in the correct orientation. At step 532, a first likelihood value, likelihood1, is calculated as follows:

$$Likelihood1 = 1 - \left(\frac{Dist12}{Dist11}\right).$$

At step 534, a second likelihood value, likelihood2, is calculated as follows:

$$Likelihood2 = 1 - \left(\frac{Dist21}{Dist22}\right).$$

Likelihood1 and likelihood2 values measure how close the start points and end points of strokes PS1 and PS2 are. The closer the respective start/end point pair, the larger the likelihood value. At step 536, the corner likelihood value is chosen to be the minimum of likelihood1 and likelihood2.

Because the corner likelihood value should be between 0 and 1, if the computed corner likelihood value is greater than 1 (step 538), the corner likelihood value is set to 1 (step 540). Also, if the computed corner likelihood value is less than 0 (step 542), the corner likelihood value is set to 0 (step 544). The corner likelihood value for stroke PS1 and PS2 is thus computed and the value is returned to corner detection process 112 for further processing (step 546).

Rectangle Detection

Referring back to FIG. 3, having defined a list of strokes 140 and a list of corners 142, method 100 now proceeds to construct image area rectangles using the strokes and corners as the building blocks. Each operation of rectangle detection step 114 detects one rectangle with the best likelihood value. When a rectangle is detected, the corners and strokes associated with that rectangle are removed from the respective lists. Specifically, when a rectangle is detected, all corners and strokes that lie on the perimeter of the rectangle and inside the rectangle are removed. Method 100 thus repeats step 114 until all image area rectangles are detected (step 116). In one embodiment, all image area rectangles are detected when there are no more corners left in the list of corners.

In the present description, an image area rectangle is constructed by four or less corners and one or more strokes. Each side of the image area rectangle is constructed by one or more strokes. Using these guidelines, a set of corner configurations can be defined to cover all possible positions of corners for the formation of image area rectangles. FIG. 25 illustrates several exemplary corner configurations. Rectangle 580 illustrates the numbering convention used in the present description. The four corners of a rectangle are referred to in a counter-clockwise manner starting from the lower left corner. Thus, a corner configuration is denoted as Config__xyzw where x is the corner position 0, y is the corner position 1, z is the corner position 2 and w is the corner position 3. A value of "1" in a corner configuration indicates the presence of a corner at that position while a value of "0" indicates the lack of a corner.

FIG. 25 illustrates three exemplary corner configurations. Rectangle 582 is a configuration with one corner only (denoted as Config__1000). Where a configuration has only one corner, the corner is always positioned at corner position 0. Rectangle 584 is a configuration with three corners occupying corner positions 0, 1 and 3. Based on the order of the corners, two corner configurations can be defined for rectangle 584. Config__1101a denotes a configuration where the corners are in the order of 0-1-3. Config__1101b denotes a configuration where the corners are in the order of 0-3-1. Rectangle 586 is a configuration of four corners, denoted as Config__1111.

In the present embodiment, a set of 12 corner configurations is defined to cover all possible configurations of interest. The configurations are defined as follows:

| | |
|---|---|
| Config__0000 | no matching corners; |
| Config__1000 | one corner at position 0; |
| Config__1100 | two corners at positions 0-1; |
| Config__1010 | two corners at positions 0-2; |
| Config__1001 | two corners at positions 0-3; |
| Config__1110a | three corners at positions 0-1-2; |
| Config__1110b | three corners at positions 0-2-1; |
| Config__1101a | three corners at positions 0-1-3; |
| Config__1101b | three corners at positions 0-3-1; |
| Config__1011a | three corners at positions 0-2-3; |
| Config__1011b | three corners at positions 0-3-2; and |
| Config__1111 | four corners at positions 0-1-2-3. |

The corner configurations defined above are used to construct hypothesis for a given corner so as to determine whether the corner can be used alone or in conjunction with other corners to form an image area rectangle.

To form an image area rectangle, strokes used to define the corners can be used to verify the validity of each rectangle. Specifically, each corner is constructed by an incoming stroke and an outgoing stroke. The convention used in the present embodiment to describe the incoming and outgoing strokes at each corner is given in FIG. 26. For example, corner position 0 is formed by incoming stroke C4S1 and outgoing stroke C4S2. This convention will be used in the following description.

Figure 24:
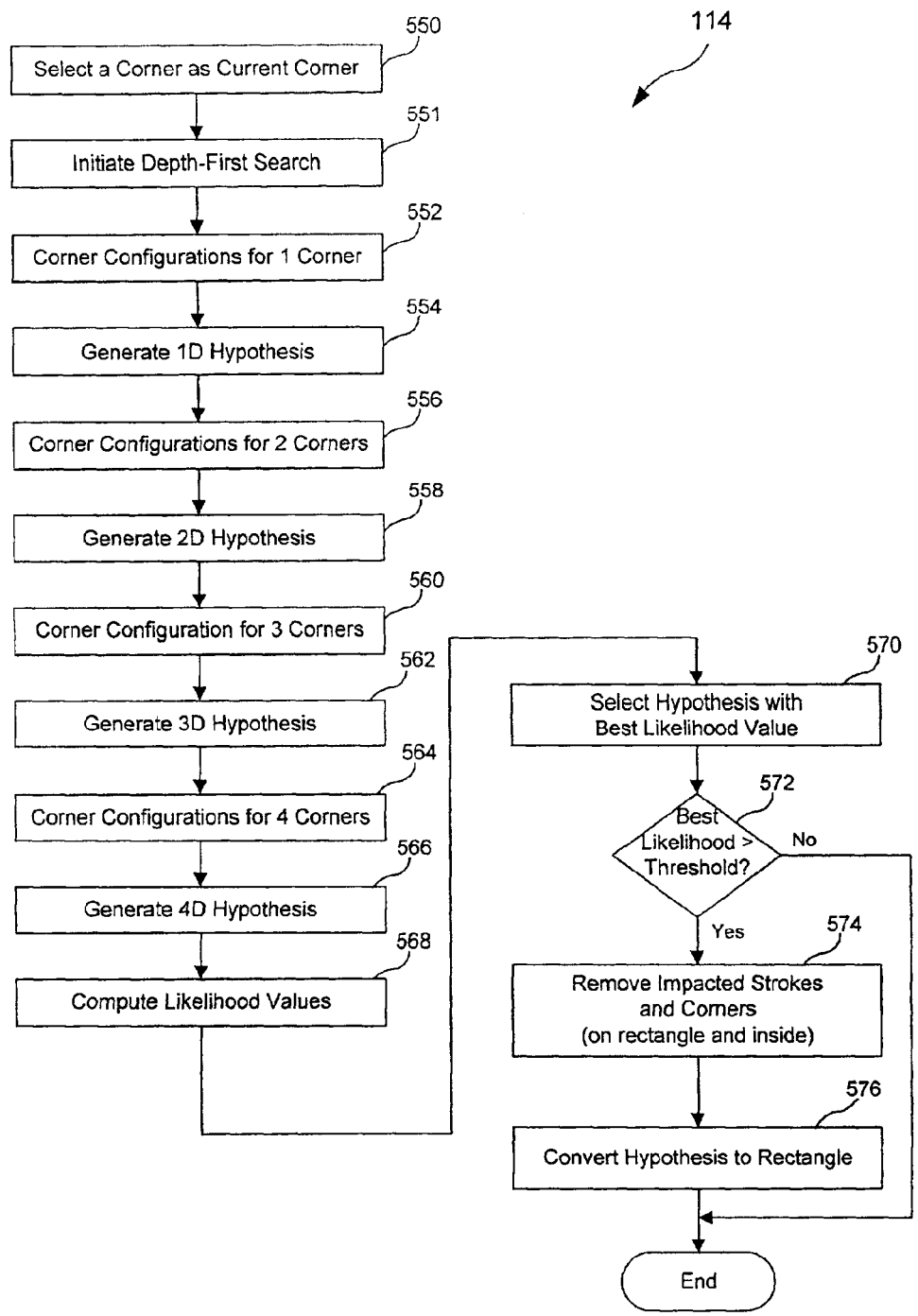
FIG. 24 is a flowchart illustrating the rectangle detection process of the image area detection method according to one embodiment of the present invention.

FIG. 24 is a flowchart illustrating the rectangle detection process of the image area detection method according to one embodiment of the present invention. Rectangle detection process 114 starts by selecting a corner from the list of corners 142 (step 550). Then, process 114 initiates a depth-first search by going through all the corners in the corner list (step 551) and generates a list of hypothesis for all possible corner configurations associated with the current corner. Depth-first searching is a well known technique for traversing graphs or trees. Specifically, depth-first search is any search algorithm which considers outgoing edges of a vertex before any neighbors of the vertex in the search. Description of the depth-first search technique can be found at www.nist.gov/dads/HTML/depthfirst.html and www1.ics.uci.edu/~eppstein/161/960215.html.

In operation, process 114 takes the current corner and determines if the current corner fits any corner configuration defined in the set of corner configurations (step 552). The determination is aided by information of the surrounding strokes. A 1D hypothesis is generated for corner configurations having one detected corner (step 554).

Then, the depth-first search operates to determine if the current corner can be matched with another corner in the corner list to fit into a two-corner configuration in the set of corner configurations (step 556). If so, a 2D hypothesis is generated for each fitted corner configurations having two detected corners (step 558).

The depth-first search continues to determine if the current corner can be matched with two other corners in the corner list to fit into a three-corner configuration in the set of corner configurations (step 560). If so, a 3D hypothesis is generated for each fitted corner configurations having three detected corners (step 562).

Lastly, the depth-first search continues to determine if the current corner can be matched with three other corners in the corner list to fit into the four-corner configuration in the set of corner configurations (step 564). If so, a 4D hypothesis is generated for the fitted corner configurations having four detected corners (step 566).

It is important to note that in the construction of the 2D, 3D and 4D hypothesis, each higher level hypothesis is built on a lower level hypothesis. That is, process 114 operates by taking a given hypothesis (having less than four detected corners) and adding a new corner into the hypothesis. Process 114 then verifies if the new corner is compatible with the existing corners. In the present embodiment, the verification criteria are as follows:

(1) Incoming and outgoing strokes of the new corner should be consistent with the incoming and outgoing strokes of the existing corners. Consistency is determined by testing whether the corresponding strokes are collinear or whether the corresponding strokes are parallel. For example, referring to FIG. 26, assume that corner 2 is the new corner added and corners 0 and 1 are the existing corners, an incoming stroke C2S1 of corner 2 should be collinear with an outgoing stroke C1S2 of corner 1. Also, the incoming stroke C2S1 should be parallel with the incoming stroke C4S1 of corner 0.

(2) Strokes corresponding to the new corner should be in the correct spatial order with strokes corresponding to the existing corners. Using the same example above, incoming stroke C2S1 should be the same stroke as outgoing stroke C1S2 or stroke C2S1 should follows C1S2. Stroke C2S1 follows stroke C1S2 when the start point of C2S1 is near the end point of stroke C1S2.

After generating the 1D, 2D, 3D and 4D hypothesis where applicable in the depth-first search, rectangle detection process 114 proceeds to compute likelihood values for each hypothesis (step 568). The likelihood value for each hypothesis is computed by identifying the strokes which fit along the perimeter of each hypothesis and computing the length of the strokes. The likelihood value is the total length of strokes which can be fitted on the perimeter of each corner configuration hypothesis. The longer the total stroke length, the larger is the likelihood value.

At step 570, the hypothesis with the best likelihood value is selected. To ensure that the likelihood value is of sufficient strength, a likelihood threshold is applied (step 572). Thus, the best likelihood value has to be greater than the likelihood threshold for the hypothesis to be valid. If the best likelihood value is less than the threshold, the hypothesis is not valid and the rectangle detection process terminates.

In the present embodiment, the likelihood value is normalized to a maximum value of 1. Therefore, the likelihood value is proportional to the total length of strokes which can be fitted to the hypothesis. A likelihood value of 0.5 represents a hypothesis where two sides of the image area rectangle can be fitted with strokes. Furthermore, in the present embodiment, a likelihood threshold of 0.48 is used. The threshold value is chosen so that a hypothesis is valid only if the hypothesis is fitted with strokes sufficient to delineate almost two sides of the image area rectangle.

If the best likelihood value is greater than the likelihood threshold, the hypothesis is deemed a valid rectangle. Process 114 then removes all the strokes and corners associated with the rectangle from the list of strokes and corners (step 574). Specifically, strokes and corners lying on the perimeter of the rectangle and strokes and corners laying within the perimeter of the rectangle are removed. Then, the hypothesis is converted into an image area rectangle (step 576). In the present embodiment, an image area rectangle is defined by the pixel locations of its four vertexes. Thus, rectangle detection process 114 outputs a set of coordinates identifying the vertexes of an image area rectangle. In this manner, an image area rectangle defining a binding box surrounding an image area is defined.

Figure 27:
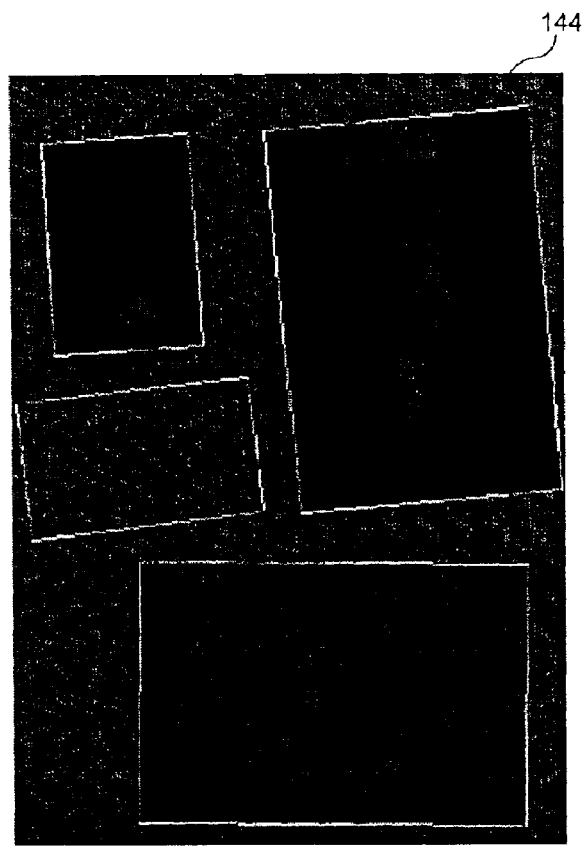
FIG. 27 is an image illustrating the detected image area rectangles for the resized image in FIG. 5.

As described above with reference to FIG. 3, rectangle detection process 114 is repeated until all rectangles have been identified, that is, when all corners have been removed from the corner list. FIG. 27 is an image illustrating the detected image area rectangles for resized image 132. The image area rectangles are shown as white binding boxes surrounding each image area. In the present illustration, rectangle detection process 114 successfully and correctly identifies four image area rectangles surrounding the four image areas in resized image 132.

Algorithm Cleanup

Figure 28:
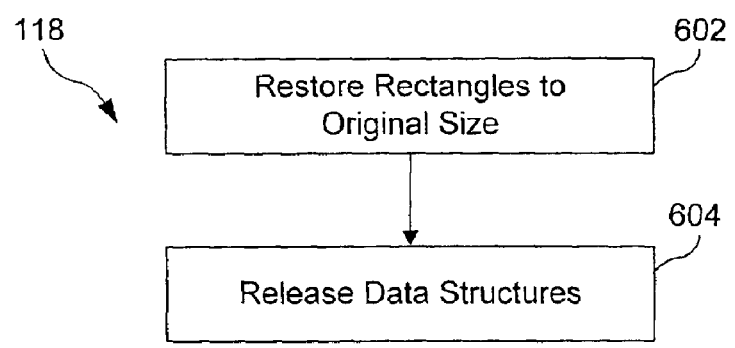
FIG. 28 is a flowchart illustrating the algorithm process of the image area detection method according to one embodiment of the present invention.

Returning to FIG. 3, after all the rectangles have been defined, method 100 performs an algorithm cleanup step 118. FIG. 28 is a flowchart illustrating the algorithm cleanup process of the image area detection method according to one embodiment of the present invention. The image area rectangles identified by the rectangle detection step are based on resized image 132 having lower image resolution. At step 602, the image area rectangles are resized to the original resolution of digital image 10. In the present embodiment, the image area rectangles are resized to the resolution of digital image 10 which has a size of 2261×3122 pixels.

Then, algorithm cleanup step 118 may perform an optional step of releasing the data structures used in method 100 (step 604). The setup and release of data structures used in the method of the present invention depend on the implementation used and data structure setup and release are well known steps in software implementation.

Summary and Advantages

The image area detection method of the present invention has numerous applications in image processing. In general, the image detection method receives a digital image containing one or more image areas and operates to automatically detect image area rectangles for each image area. The list of the image area rectangles generated by the method of the present invention can be provided to any image editing tool for use in cropping the image areas. Conventional image editing tools which can utilize the list of image area rectangles generated by the method of the present invention include ArcSoft's PhotoStudio 2000, available from Arcsoft, Inc., and Adobe PhotoShop, available from Adobe System Incorporated.

The image area detection method of the present invention incorporates image processing techniques such as region segmentation, edge detection and spatial reasoning to generate reliable and accurate detection results. The image area detection method is very robust as shown by the detected rectangles result in FIG. 27. The method is able to detect image areas which are slanted or not a perfect rectangle. Furthermore, the method is able to detect an image area even when the image area has the same background color as the background of the digital image and one or more of the boundaries of the image area are missing. In FIG. 27, the method of the present invention correctly identifies an image area rectangle for the business card even though only two sides of the business card are recognized in the digital image (see for example the stroke detection result in FIG. 16). The image area detection method of the present invention achieves reliable and robust detection result not attainable using conventional techniques.

When used in conjunction with a scanner for scanning multiple images at each scan job, the method of the present invention can improve the performance of the scanner by allowing multiple image objects to be scanned at the same time and automatically detecting the multiple image objects subsequent to the scanning process.

The method of the present invention can be implemented either in software or in hardware. In one embodiment, the method is implemented as a dynamically linked library accessible by any conventional image editing software.

The above detailed descriptions are provided to illustrate specific embodiments of the present invention and are not intended to be limiting. Numerous modifications and variations within the scope of the present invention are possible. For example, while the flowcharts in the figures of the present invention illustrate certain process sequence. One of ordinary skill in the art, upon being apprised of the present invention, would know that some of the process sequence can be rearranged to achieve the same result. The process sequence in the flowcharts are illustrative only. The present invention is defined by the appended claims.

I claim:

1. A method for detecting an image area in a digital image including said image area and a background area, said digital image being represented as a two-dimensional array of pixel values, comprising:

identifying in said digital image a first image region indicative of said background area and a second image region indicative of said image area;

computing gradient values using said pixel values for pixel locations in said digital image associated with a boundary between said first image region and said second image region;

defining a plurality of strokes based on said gradient values, each stroke being a line segment having a start pixel location and an end pixel location, and each stroke being derived from a region of pixel locations having non-zero gradient values of the same sign, wherein pixel locations to a first side of each stroke are in said second image region and pixel locations to a second side of each stroke are in said first image region;

merging said plurality of strokes, wherein a first stroke and a second stroke in said plurality of strokes are merged when said first and second strokes are collinear and a start pixel location of one of said first and second strokes is near an end pixel location of the other one of said first and second strokes;

defining a plurality of corners using said strokes, wherein each corner is a pixel location of an intersection of a third stroke and a fourth stroke, said third stroke and said fourth stroke forming a corner when said third stroke is perpendicular to said fourth stroke, said third and fourth strokes are arranged in a correct orientation, and a start pixel location of one of said third and fourth strokes is close to an end pixel location of the other one of said third and fourth strokes; and defining an image area rectangle delimiting said image area using said plurality of corners and said plurality of strokes, wherein said image area rectangle is defined based on one or more corners fitting a predefined corner configuration and one or more strokes associated with said one or more corners, said one or more strokes forming at least a portion of a perimeter of said image area rectangle.

2. The method of claim 1, further comprising:

before said identifying in said digital image said first image region and said second image region, resizing said digital image to a reduced size digital image, said reduced size digital image having a lower resolution than said digital image;

wherein said reduced size digital image is used as said digital image in acts following said act of resizing.

3. The method of claim 2, wherein said digital image has a size of at least 2000×3000 pixels and said reduced size digital image has a size of 512×512 pixels or less.

4. The method of claim 2, wherein said resizing comprises averaging an n×n neighborhood of pixel values at each pixel location.

5. The method of claim 2, wherein said image area rectangle is defined for said reduced sized digital image and said method further comprises:

resizing said image area rectangle to a size equal to the size of said digital image.

6. The method of claim 1, wherein said identifying in said digital image said first image region and said second image region comprises:

(a) selecting a pixel location in said digital image;
   (b) determining if a pixel value at a pixel location in said digital image is greater than a threshold value;
   (c) if said pixel value is greater than said threshold value, identifying said pixel location as being in said first image region; and
   (d) if said pixel value is not greater than said threshold value, identifying said pixel location as being in said second image region.

7. The method of claim 6, further comprising repeating said acts (a) to (d) to identify each pixel location in said digital image as in said first image region or said second image region.

8. The method of claim 6, wherein said threshold value is selected to identify pixel values indicative of a white color as being in said first image region.

9. The method of claim 6, wherein each of said pixel value is a color pixel value comprising pixel values for at least three color components, and said act (b) comprises determining if pixel values for said at least three color components at a pixel location are each greater than said threshold value.

10. The method of claim 1, wherein said computing gradient values using said pixel values comprises:

computing gradient values in a vertical direction for each pixel location except pixel locations at a perimeter of said digital image;

computing gradient values in a horizontal direction for each pixel location except pixel locations at the perimeter of said digital image;

for each pixel location, selecting the larger of said vertical and said horizontal gradient values as a selected gradient value; and storing said selected gradient value for a pixel location if said pixel location is in said first image region or within one pixel location of said first image region.

11. The method of claim 10, wherein each of said pixel value is a color pixel value comprising pixel values for at least three color components, said computing gradient values in said vertical direction and in said horizontal direction each comprises:

computing gradient values for each of said at least three color components using said color pixel value; and selecting the largest of said gradient values of said at least three color components as said gradient value for said pixel location.

12. The method of claim 1, wherein when a stroke is viewed from said start pixel location to said end pixel location, said first side of said stroke is a left side and said second side of said stroke is a right side.

13. The method of claim 1, wherein said defining a plurality of strokes comprises:

selecting a first pixel location in said digital image having a non-zero gradient value;

determining a sign of said non-zero gradient value;

tracing a region surrounding said first pixel location for pixels having a non-zero gradient value with the same sign as said sign of said first pixel location;

determining if said region has an area greater than a threshold value;

if said region has an area greater than said threshold value, fitting a straight line through said region; and defining a start point and an end point of a first stroke using said straight line and said sign of said first pixel location.

14. The method of claim 13, wherein said fitting a straight line through said region uses a linear regression technique and each pixel location in said region is weighted by a corresponding gradient value.

15. The method of claim 13, wherein said tracing a region surrounding said first pixel location comprises tracing pixel locations to the left, the right, the top and the bottom of said first pixel location.

16. The method of claim 1, wherein said merging said plurality of strokes comprises:

selecting said first stroke and said second stroke in said plurality of strokes;

determining if said first stroke and said second stroke are collinear;

if said first stroke and said second stroke are collinear, determining if an end pixel location of said first stroke is close to a start pixel location of said second stroke; and if said end pixel location of said first stroke is close to said start pixel location of said second stroke, merging said first stroke and said second stroke.

17. The method of claim 16, wherein said merging said first stroke and said second stroke comprises setting said end pixel location of said first stroke to an end pixel location of said second stroke.

18. The method of claim 16, wherein said end pixel location of said first stroke is close to said start pixel location of said second stroke when said end pixel location of said first stroke is within 4 pixels of said start pixel location of said second stroke.

19. The method of claim 16, further comprises:

if said end pixel location of said first stroke is not close to said start pixel location of said second stroke, determining if a start pixel location of said first stroke is close to an end pixel location of said second stroke; and if said start pixel location of said first stroke is close to said end pixel location of said second stroke, merging said second stroke and said first stroke.

20. The method of claim 19, wherein said merging said second stroke and said first stroke comprises setting said start pixel location of said first stroke to a start pixel location of said second stroke.

21. The method of claim 19, wherein said start pixel location of said first stroke is close to said end pixel location of said second stroke when said start pixel location of said first stroke is within 4 pixels of said end pixel location of said second stroke.

22. The method of claim 16, wherein said determining if said first stroke and said second stroke are collinear comprises:

determining the length of said first stroke and said second stroke;

assigning a stroke A as the longer of said first stroke and said second stroke;

assigning a stroke B as the shorter of said first stroke and said second stroke;

determining if a first vertical distance from a start pixel location of said stroke B to said stroke A is less than a threshold value;

determining if a second vertical distance from an end pixel location of said stroke B to said stroke A is less than said threshold value; and if said first and second vertical distances are both less than said threshold value, returning a value indicating said first stroke and said second stroke are collinear.

23. The method of claim 22, wherein said threshold value is 2 pixels.

24. The method of claim 1, wherein in defining a plurality of corners, said third and fourth strokes are arranged in the correct orientation when said start pixel location and said end pixel location of each of said third and fourth strokes are arranged in a counter-clockwise direction.

25. The method of claim 1, wherein in defining a plurality of corners, said start pixel location of one of said third and fourth strokes is close to said end pixel location of the other one of said third and fourth strokes is determined by computing a corner likelihood value.

26. The method of claim 25, wherein said computing a corner likelihood value comprises:

computing a first distance being a vertical distance from said start pixel location of said third stroke to said fourth stroke;

computing a second distance being a vertical distance from said end pixel location of said third stroke to said fourth stroke;

computing a third distance being a vertical distance from said start pixel location of said fourth stroke to said third stroke;

computing a fourth distance being a vertical distance from said end pixel location of said fourth stroke to said third stroke;

computing a first likelihood value using the equation: 1—(second distance/first distance);

computing a fourth likelihood value using the equation: 1—(third distance/fourth distance); and selecting the smaller of said third likelihood value and said fourth likelihood value as said corner likelihood value.

27. The method of claim 26, further comprising:

comparing said corner likelihood value to a threshold value;

wherein said start pixel location of one of said third and fourth strokes is close to said end pixel location of the other one of said third and fourth strokes when said corner likelihood value is greater than said threshold value.

28. The method of claim 1, wherein said image area is one of a plurality of image areas and said defining an image area rectangle comprises defining a plurality of image area rectangles, each image area rectangle delimiting one of said plurality of image areas.

29. The method of claim 1, wherein said predefined corner configuration is one of a plurality of predefined corner configurations, said plurality of predefined corner configurations comprising a one-corner configuration, two-corner configurations, three-corner configurations and a four-corner configuration.

30. The method of claim 29, wherein said defining an image area rectangle comprises:
- selecting a first corner from said plurality of corners;
- initiating a depth-first search of corners in said plurality of corners;
- generating a one-corner hypothesis based on said one-corner configuration;
- generating a two-corner hypothesis based on said two-corner configurations;
- generating a three-corner hypothesis based on said three-corner configurations;
- generating a four-corner hypothesis based on said four-corner configuration;
- computing a likelihood value for each of said one-corner hypothesis, said two-corner hypothesis, said three-corner hypothesis, and said four-corner hypothesis;
- selecting an hypothesis with the largest likelihood value;
- determining if said likelihood value is greater than a threshold value; and
- if said likelihood value is greater than a threshold value, defining said image area rectangle using said selected hypothesis.

31. The method of claim 30, wherein said computing a likelihood value for each of said one-corner hypothesis, said two-corner hypothesis, said three-corner hypothesis, and said four-corner hypothesis comprises:
- determining a set of strokes from said plurality of strokes forming a perimeter of each of said hypothesis;
- determining a total length of said set of strokes; and
- setting said likelihood value equal to said total length of said set of strokes.

32. The method of claim 30, further comprising:
- if said likelihood value is greater than a threshold value, removing strokes and corners forming a perimeter of said image area rectangle and strokes and corners within said image area rectangle.

* * * * *

UNITED STATES PATENT AND TRADEMARK OFFICE
CERTIFICATE OF CORRECTION

PATENT NO.    : 6,898,316 B2
DATED         : May 24, 2005
INVENTOR(S)   : Lingxiang Zhou It is certified that error appears in the above-identified patent and that said Letters Patent is hereby corrected as shown below:

<u>Column 26,</u>
Line 12, where "to a size equal to the" should read -- to a proportional size in --.
Line 13, where "size of said digital image" should read -- said digital image --.

Signed and Sealed this

Twenty-fifth Day of October, 2005

JON W. DUDAS
*Director of the United States Patent and Trademark Office*